(12) United States Patent
Rollings et al.

(10) Patent No.: US 11,126,647 B2
(45) Date of Patent: Sep. 21, 2021

(54) SYSTEM AND METHOD FOR HIERARCHICALLY ORGANIZING DOCUMENTS BASED ON DOCUMENT PORTIONS

(71) Applicant: CS Disco, Inc., Austin, TX (US)

(72) Inventors: Ryan Connor Rollings, Austin, TX (US); Verlyn Michael Fischer, Cedar Park, TX (US); Alan Justin Lockett, Georgetown, TX (US)

(73) Assignee: CS DISCO, INC., Austin, TX (US)

( * ) Notice: Subject to any disclaimer, the term of this patent is extended or adjusted under 35 U.S.C. 154(b) by 4 days.

(21) Appl. No.: 16/714,450

(22) Filed: Dec. 13, 2019

(65) Prior Publication Data

US 2021/0182328 A1 Jun. 17, 2021

(51) Int. Cl.
*G06F 16/35* (2019.01)
*G06F 40/295* (2020.01)
*G06F 16/31* (2019.01)
*G06F 16/93* (2019.01)

(52) U.S. Cl.
CPC .......... *G06F 16/355* (2019.01); *G06F 16/313* (2019.01); *G06F 16/93* (2019.01); *G06F 40/295* (2020.01)

(58) Field of Classification Search
CPC ................................................. G06F 16/355
See application file for complete search history.

(56) References Cited

U.S. PATENT DOCUMENTS

| | | | |
|---|---|---|---|
| 9,026,535 B2 | 5/2015 | Jakubik | |
| 9,367,604 B2 | 6/2016 | Lu et al. | |
| 10,191,977 B2 | 1/2019 | George et al. | |
| 10,242,261 B1 | 3/2019 | Price | |
| 2002/0107853 A1 | 8/2002 | Hofmann et al. | |
| 2006/0095852 A1* | 5/2006 | Trepess | G06F 16/355 |
| | | | 715/741 |
| 2007/0294241 A1* | 12/2007 | Surendran | G06F 16/355 |
| 2013/0346128 A1 | 12/2013 | Kibbe | |

(Continued)

OTHER PUBLICATIONS

Randhawa, Ramandeep S., et al., Topic Modelling Using Distributed Word Embeddings, at <https://arxiv.org/pdf/1603.04747.pdf>, Feb. 12, 2016, 17 pgs.

(Continued)

*Primary Examiner* — Hau H Hoang
(74) *Attorney, Agent, or Firm* — Sprinkle IP Law Group

(57) ABSTRACT

Embodiments as disclosed may generate an organizational hierarchy based on embeddings of portions of documents. Embeddings resulting from the embedding of the portions of the documents can be clustered using a hierarchical clustering mechanism to segment the portion space into a set of hierarchical clusters. Documents can be assigned to these clusters based on the presence of a portion of a document within a cluster. In this manner, the documents may themselves be clustered based on the clusters created from portions across the documents of the corpus. The clusters to which a document is assigned may also be ranked with respect to that document. Similarly, documents assigned to cluster can be ranked within the cluster to which they are assigned. Additionally, in certain embodiments, names or snippets for the clusters of the hierarchy may be derived from the portions comprising that cluster.

24 Claims, 13 Drawing Sheets

Example document

From: Deora Ramlinson
Sent: August 4, 2017
To: ZDR Goode, EDR Szalay, JDR Soone
Subject: Pricing changes
Team, This week we'll be revisiting the customer pricing strategy for the Americas. We'll push through the issue with Brazil and see if we can come up with a plan that will complete by Q2 2018. Check in with Sam for your lunch preferences that day.

Thanks,
Deora

Extracted document portions: 282a, 282b, 282c

(56) References Cited

U.S. PATENT DOCUMENTS

2017/0004208 A1* 1/2017 Podder .................. G06F 16/367
2018/0285453 A1 10/2018 Beckman et al.
2019/0102400 A1* 4/2019 Kumaran ............ G10L 15/1815
2019/0220695 A1 7/2019 Nefedov
2020/0311344 A1* 10/2020 Tripathi ................ G06F 40/284

OTHER PUBLICATIONS

Wu, Ledell, et al., StarSpace: Embed All The Things!, Association for the Advancement of Artificial Intelligence (www.aaai.org), arXiv:1709.03856v5 [cs.CL], , at <https://arxiv.org/abs/1709.03856>. Nov. 21, 2017, 9 pgs.

Peters, Matthew E., et al., Deep Contextualized Word Representations, arXiv:1802.05365v2, at <https://arxiv.org/abs/1802.05365>, Mar. 22, 2018, 15 pgs.

Pennington, Jeffrey, et al., GloVe: Global Vectors for Word Representation, Conference Proceedings of the 2014 Conference on Empirical Methods in Natural Language Processing (EMNLP), at <https://nlp.stanford.edu/projects/glove/>, Jan. 2014, 3 pgs.

Mikolov, Tomas, et al., Distributed Representations of Words and Phrases and their Compositionality, arXiv:1310.4546v1 [cs.CL], Oct. 16, 2013, 9 pgs. at <https://arxiv.org/abs/1310.4546>.

Arora, Sanjeev, et al., A Simple but Tough-to-Beat Baseline for Sentence Embeddings, ICLR 2017, at <https://openreview.net/forum?id=SyK00v5xx>, 2017, 16 pgs.

* cited by examiner

Example document

From: Deora Ramlinson
Sent: August 4, 2017
To: ZDR Goode, EDR Szalay, JDR Soone
Subject: Pricing changes
Team,

| This week we'll be revisiting the customer pricing strategy for the Americas. ~282a
| We'll push through the issue with Brazil and see if we can come up with a plan that will complete by Q2 2018. ~282b  } Extracted document portions
| Check in with Sam for your lunch preferences that day. ~282c Thanks,
Deora

FIG. 2A

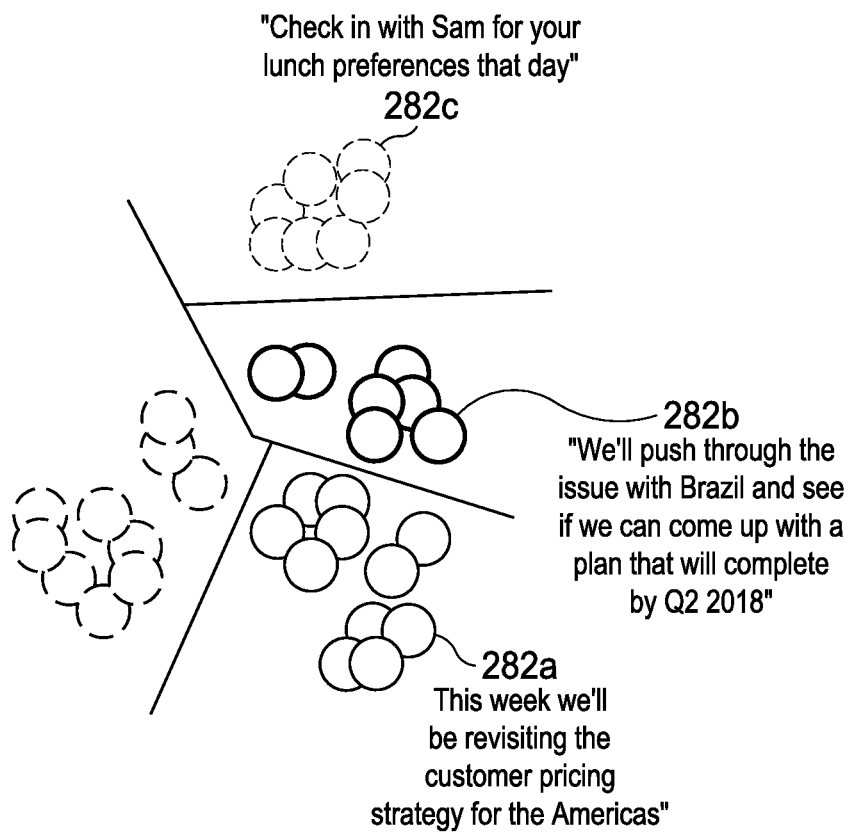

FIG. 2B

| LEVEL 1 | LEVEL 2 | LEVEL 3 |
|---|---|---|
| FORMAL CONFIDENTIALITY AGREEMENT, ISSUE, PRICE, HOURLY RATES<br><br>250a1 | FORMAL AGREEMENT, CONFIDENTIALITY, REQUIREMENTS<br><br>250b1 | CONFIDENTIALITY AGREEMENT, NON DISCLOSURE AGREEMENT  250c1 |
| | | INTENDED, END USER, SHARE<br>250c2 |
| | LEGAL REQUIREMENTS, HOURLY RATE, PROVISIONAL, INTERACTION<br><br>250b2 | HOURLY RATE, PRICE, REMIT  250c |
| | | 250c |
| | PROVISION, OBLIGATIONS, CREDIT AGREEMENT, REVENUE, SHARING OBLIGATIONS, PAYMENT<br><br>250b3 | REVENUE, DISTRIBUTION AGREEMENT, AGREEMENT  250c |
| | | CREDIT AGREEMENT, CREDIT  250c |
| | | ...  250c |
| DEMAND, NUMEROUS SUPPLIERS, BID PRICES, REAL TIME ENERGY, PRICE, GAS, UNCOMPETITIVE CONDITIONS, ENERGY<br>250a | TRADE, FLOOR PRICE, DERIVATIVE  250b | 250c |
| | | 250c |
| | FLOW RATE, UP TIME, POWER CAPACITY  250b | |
| | NUMEROUS SUPPLIERS, SUPPLIER  250b | |
| EMAIL, SOFTWARE, APPLICATIONS, FAX NUMBER, WEB, INFORMATION, MAIL, MESSAGE, FAX COVER SHEET<br>250a | SOFTWARE, UPGRADE, SUBSCRIPTION  250b | 250c |
| | | 250c |
| | EMAIL, SERVICE, HELP DESK, CORRECTION, IT DEPARTMENT  250b | IT DEPARTMENT, PLUG, RESET, BUTTON, ON, OFF, CHECK  250c |
| | | 250c |

SYSTEM AND METHOD FOR HIERARCHICALLY ORGANIZING DOCUMENTS BASED ON DOCUMENT PORTIONS

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to semantic analysis and understanding of electronic documents. In particular, this disclosure relates to the semantic analysis and understanding of a potentially large corpus of documents through clustering and topic modeling. Even more specifically, this disclosure relates to the application of word or other types of embedding and hierarchical clustering to portions of documents within a corpus to generate semantically meaningful clusters of those documents and associated descriptions for those clusters, which can be usefully applied in a variety of contexts, including document analysis systems.

BACKGROUND

In the modern world, the vast majority of documents that are being created, utilized and maintained are in electronic format. A number of different situations commonly arise that require an analysis or identification of certain relevant electronic documents from a relatively large pool of available electronic documents. These situations are generally referred to as information retrieval or search problems. These types of search problems crop up in a wide variety of contexts. For example, in litigation, an entity's documents may need to be reviewed in order to identify documents that may be relevant to one or more issues in the litigation. In other examples, certain regulatory filings may require review of a number of documents to identify documents that may be relevant to one or more issues in the regulatory filing.

To illustrate in more detail, parties to litigation typically have to share relevant evidence with opposing counsel through the discovery process. In many cases, each party makes a reasonable search of their records based on some set of terms or keywords and produces the results of the search to the other party. Discovery thus typically involves the gathering of potentially relevant materials, much of it digital, and then reviewing such materials to determine what to be shared with opposite parties. Additionally, during the course of the litigation each party may continually review those documents produced by the opposing party to locate documents relevant to the case at hand. Litigation thus represents a microcosm of a more general problem raised by the high volume of electronic documents present in a variety of contexts. Namely, how can a large volume of electronic documents be understood, reviewed, or searched in order that documents relevant to a particular topic or user's interest may be located.

To aid users in resolving these problems, a document analysis system, may be provided in a given electronic context. A document analysis, document review, information retrieval, or search system (which all will be utilized here substantially interchangeably) is a computer program used to process a corpus of electronically stored information (referred to as the corpus) and allow users to analyze, review or navigate the information, or search the electronic information to return electronically stored information responsive to a search (also referred to as a query). Items of electronic information that form a corpus may be referred to interchangeably as (electronic) documents, items, files, objects, items, content, etc. and may include objects such as files of almost any type including documents for various editing applications, emails, workflows, etc. In a conventional document analysis system, a user may submit a query and the search engine selects a set of results from the corpus based on the terms of the search query. The terms of search queries usually specify words, terms, phrases, logical relationships, metadata fields to be searched, synonyms, stemming variations, etc. For example, most people are familiar with generally available Internet or web based search engines such as Google or Microsoft's Bing. Additionally, most computer applications tailored to a particular context may include their own proprietary search engines. In the context of litigation or discovery, for example, many Technology Assisted Review (TAR) applications may include their own search engine.

Problematically, there are two main systems and methods for attempting to organize a corpus of documents to allow navigation or searching of that corpus to find relevant documents, both of which have proved inadequate. The first approach involves machine learning assisted classification of the documents within a corpus according to relevance by human reviewers. These coded documents can then feed a machine learning model in a feedback cycle whereby the machine learning model will ostensibly get better at identifying relevant documents based on the human encodings. This solution is slow and inefficient as it requires substantial amounts of human involvement to code the documents and, moreover, such a solution deals poorly with incorporating new documents which may pertain to different topics.

The other approach to the search of documents involves the use of keywords. In these types of systems, the documents are analyzed based on the keywords of the documents of the corpus. This approach fails for a number of reasons. One reason is that the keywords that are going to be utilized to locate documents, or that are otherwise of interest or relevant, may often times not be known in advance of the analysis or indexing of the documents. Additionally, many documents including the keywords may not be relevant to the actual topics in which a user is interested. In some instances, this irrelevance may stem from the fact that a keyword search does not account for the semantics of those keywords. Accordingly, the presence of homographs in the corpus may result in all the documents including a keyword being returned in response to a keyword search for that term, regardless of the meaning of the term intended by the user.

It would thus be desirable to have improved systems and methods for the semantic analysis and understanding of a potentially large corpus of documents, which can be usefully applied in a variety of contexts, including document analysis systems.

SUMMARY

To continue with the above discussion, the problems with the use of keywords as the basis for the analysis and navigation or search of documents in a corpus permeates many attempts to address the issues involved in document analysis systems. Many attempted solutions, such as clustering (e.g., k-means, agglomerative) and topic models (e.g., Latent Semantic Analysis (LSA), Probabilistic LSA, Linear Discriminant Analysis (LDA), etc.) have been applied to document corpora. However, the application of these techniques has generally been at the keyword level, so that the clustering or topic models that result include an organization that is keyword centric. Thus, the application of these techniques also exhibit the problems inherent to keyword based analysis (e.g., the loss of the document context and providing a less useful platform for exploring a document corpus).

Moreover, while documents may be clustered or grouped (e.g., using a topic model), the lack of organizational structure of the documents of the corpus, or of clusters or groups of those documents, makes detailed exploration or iterative refinement of a search or set of resulting documents extremely difficult. Further complicating the search or navigation process, as these techniques may still be keyword based, the context and semantics of the documents is lost, increasing the difficulty of exploring such document, despite the groupings. Specifically, the organizational structure provided by typical clustering or grouping of documents (including such keyword clustering or grouping) fails to impose any semantically meaningful structure on the documents, as the clusters are usually based solely on syntactically related content of the documents, as opposed to the semantic content of those documents.

To address the shortcomings of certain approaches to the organization of documents among other ends, embodiments of the systems and methods as disclosed may generate an induced organizational hierarchy based on embeddings of portions of documents. These portions may include entire documents, paragraphs, sentences, phrases, words or some other syntactically or semantically defined unit. Embedding is a method of converting sets of discrete objects into points within a space and serves to quantify or categorize semantic similarities between linguistic items based on their distributional properties in large samples of language data. The spatial encoding thus represents important characteristics of the objects (e.g. objects close to one another may be semantically similar.). One method for embedding uses artificial neural networks. Embodiments may thus utilize a document portion based, or another type of, embedding technique such as smoothed inverse frequency (SIF) in association with word embedding vectors such as FastText, Word2Vec, GLoVE, BERT, ELMO, etc. to embed the portions of the document of the corpus (e.g., as n-dimensional vectors). These embedding approaches tend to place document portion embeddings in a location within the embedding space close to other document portion embeddings with a similar meaning.

The embeddings resulting from the embedding of the portions of the documents can then be clustered using a hierarchical clustering mechanism to segment the portion space into a set of hierarchical clusters. The hierarchical clustering mechanism utilized may be almost any hierarchical clustering method known, including for example, recursive k-means clustering, agglomerative clustering, convex clustering, recursive LDA or LSA, etc. The resulting hierarchical clusters are thus clusters of portions across the entire corpus of documents based on those portions' embeddings. As each embedding reflects the semantics of a corresponding portion, the portions of each cluster represent semantically related portions, and the hierarchical clusters comprise a semantically based organizational hierarchy.

Embodiments can then assign documents to the clusters of the hierarchy based on, for example the presence of a portion of a document within a cluster. In this manner, the documents may themselves be clustered based on the clusters created from portions across the documents of the corpus. Moreover, as the hierarchical clusters are semantically based, the assignment of the documents to the clusters of the hierarchy serves to impose a semantic structure on the documents, allowing more useful and powerful analysis of these documents.

The clusters to which a document is assigned (or a subset thereof) may also be ranked with respect to that document based on a number of portions of that document within each of the assigned clusters. Similarly, documents assigned to cluster can be ranked within the cluster to which they are assigned based on a ranking of the portions of those documents assigned to the cluster.

Additionally, in certain embodiments, names or snippets for the clusters of the hierarchy may be derived from the portions comprising that cluster. A name may be a descriptive word, term or phrase for a cluster, while a snippet may be a portion assigned to cluster having a rank with respect to that cluster (or the portions comprising the cluster) above some snippet threshold. These names or snippets for a cluster may be determined, for example, though analysis of the portions comprising the clusters, including linguistic or natural language processing or embedding based on spatial analysis techniques, among others.

Embodiments as presented herein may thus have a number of advantages. The use of an organizational hierarchy may serve to give users of a document analysis system or the like a "table of contents" like view of a document corpus. As the organizational hierarchy is based on embeddings of portions that may include spatial representations of multi-word portions, the clusters may more closely reflect the concepts or topics included in the documents of the corpus. Moreover, embodiments may extract names, pertinent portions or other information from documents using these spatial representations based on the organizational hierarchy, allowing more topical naming and summaries to be provided for elements, nodes or clusters of that organizational hierarchy.

Again, as embodiments may utilize document or portion level embeddings as a basis for application of hierarchical clustering technique certain embodiments may have the advantage of aggregating documents so that documents with similar meanings are clustered together regardless of the particular words, terms, phrases or sentences comprising the document. Furthermore, it will be realized that documents may include multiple related or unrelated concepts. As embodiments may be based on portions, embodiments may allow documents to be assigned to clusters associated with each of many concepts that may be embodied in the document. Specifically, as the hierarchical clusters comprise a semantically based organizational hierarchy of portions, documents may be assigned to each cluster comprising a portion of that document, allowing the document to be associated with the concepts of those clusters regardless both of the relationship of those concepts to one another (e.g., either universally or in the context of the document) and of the relationships of those clusters to one another in the hierarchy.

Similarly, the fact that the clustering is based on portions or documents means that the resulting hierarchical clusters are better aligned with the user's expectation and have cognitive fidelity with human understanding, since the user reads snippets of text and forms meaning from them based on context rather than individual words. For certain size portions the resulting leaf clusters may have a tighter, more coherent meaning than with document-level clustering or keywords.

Additionally, embodiments may have the capability of associating document portions with clusters in order to illustrate the meaning of the documents associated with a cluster. Importantly, embodiments may also be able to name a cluster using labels, terms or individual words that are easily comprehended by users, despite the fact that the clusters themselves are not derived from keywords. Thus, embodiments may provide relatively more information regarding the clusters and associated documents while grouping documents in a more intuitive way that can have the benefit of revealing the key elements of the corpus in certain circumstances. Accordingly, embodiments allow users to quickly drill-down to relevant and meaningful content within a short period of time by leveraging the hierarchical clusters and associated meaningful labels.

In one embodiment, a system for document analysis can include a data store having a corpus comprising a set of electronic documents. The documents of the corpus can be obtained and portions determined from the set of documents of the corpus. An organizational hierarchy comprising hierarchically organized clusters can be generated where each cluster is associated with a corresponding subset of portions. The organizational hierarchy can be generated by embedding each of the portions to generate a portion embedding vector for each of the portions, clustering the portions based on the portion embedding vectors for the portions to generate initial clusters of the organizational hierarchy, wherein each of the generated initial clusters is associated with the corresponding subset of portions, and recursively clustering each of the initial clusters by clustering the corresponding subset of portions of that initial cluster until a termination criteria is met. Each of the set of electronic documents can be associated with every cluster within the hierarchically organized clusters that is associated with at least one of the portions determined from that document.

In some embodiments, a set of snippets for the clusters of the hierarchically organized clusters can be determined, wherein the set of snippets for a cluster are determined by ranking at least some of a subset of portions associated with the cluster.

In certain embodiments, ranking at least some of the subset of portions associated with the cluster comprises ranking at least some of the subset of portions for each leaf cluster of the hierarchically organized clusters based on a score determined for each of the at least some of the subset of portions, wherein scoring a portion for a leaf cluster is based on the portion embedding vector for the portion and a centroid of the leaf cluster. At least some of the subset of the portions for each parent cluster of the hierarchically organized clusters can then be ranked based on the ranking of at least some of the subset of the portions associated with each child cluster of that parent cluster.

In particular embodiments, a name for each cluster of the set of hierarchically organized clusters is determined by extracting terms from at least some of the subset of portions associated with the cluster, embedding the extracted terms to generate a term embedding vector for each term, scoring the extracted terms to determine a score for each extracted term, and selecting the names for the cluster based on the scores for the extracted terms.

In one embodiment, each of the portions is a sentence and clustering may be performed using k-means clustering.

In a specific embodiment, the set of electronic documents comprises documents in multiple languages.

In one embodiment, the system can filter a list of documents based on the organizational hierarchy, or generate a pruned organizational hierarchy by pruning the organizational hierarchy based on a list of documents.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 2A and 2B are depictions of document portions and their clustering.

FIGS. 2C and 2D are depictions of interfaces that may be utilized by embodiments of a document analysis system.

DETAILED DESCRIPTION

Figure 1:
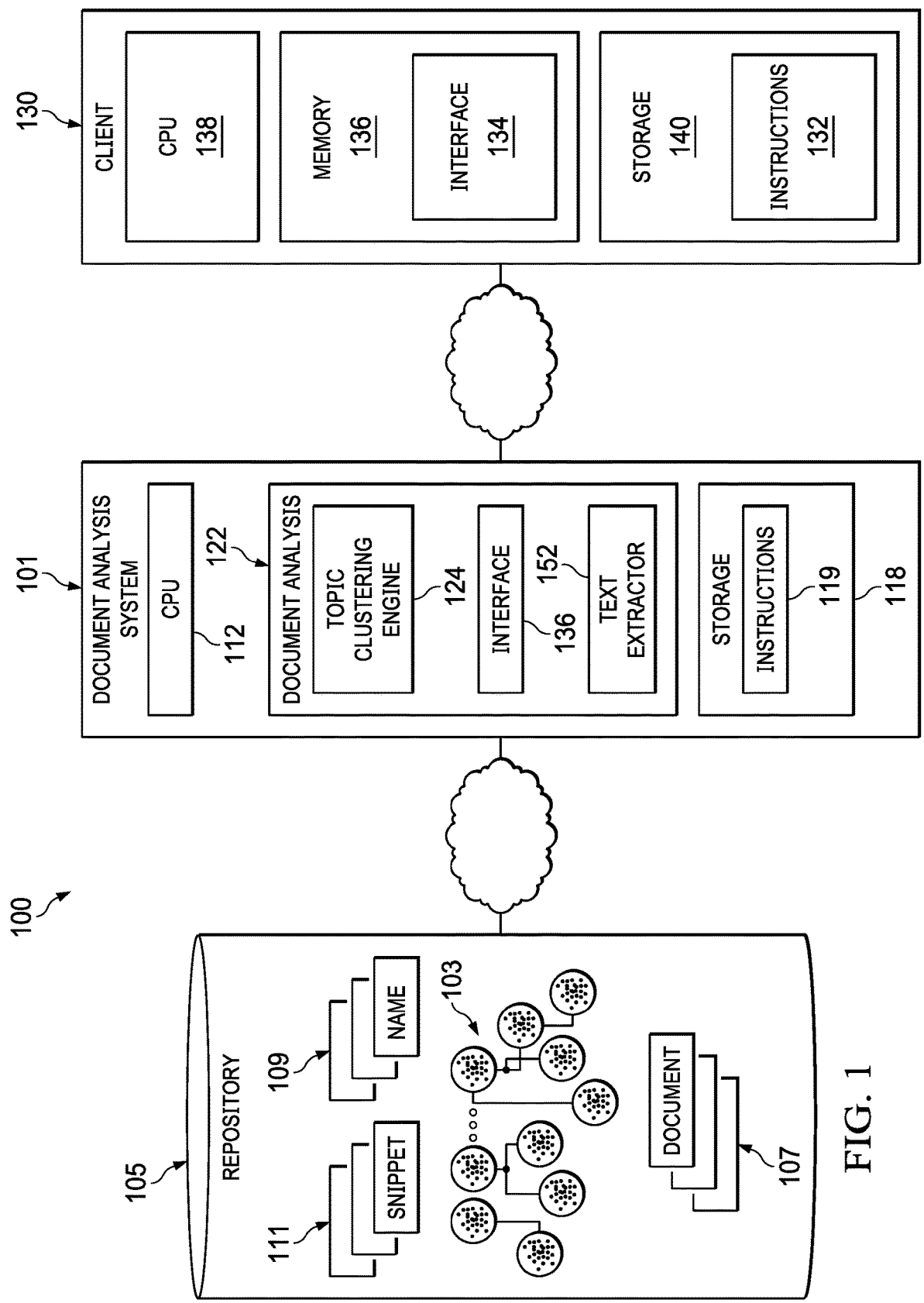
FIG. 1 is a block diagram of one embodiment of an architecture including a document analysis system.

The disclosure and various features and advantageous details thereof are explained more fully with reference to the exemplary, and therefore non-limiting, embodiments illustrated in the accompanying drawings and detailed in the following description. It should be understood, however, that the detailed description and specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in more detail, it may be helpful to discuss some context around document analysis systems. A document analysis system is a computer system used to process electronically stored information (i.e., a document corpus) and navigate, search or otherwise review the electronic information. To aid in the user's review of a document corpus these document analysis systems impose, or determine, an organizational structure for the document corpus. This organizational structure may be, for example, an index of the words or terms of the corpus or groupings of the documents of the corpus. In the main, document analysis systems have attempted to provide such an organizational structure for a corpus of document based on human involved structuring of the documents or keyword based evaluation of the content or topics of the documents of the corpus. These keyword based systems have proven inadequate for a variety of reasons, including that the keyword based analysis fails to take into account the context of the documents including such keywords. It would thus be desirable to have improved systems and methods for the semantic analysis and understanding of a corpus of documents which can be usefully applied in a variety of contexts, including document analysis systems.

Attention is thus directed to embodiments of the systems and methods as disclosed herein. Embodiments of these systems and methods may generate an induced organizational hierarchy based on embeddings of portions of documents within a document corpus. These portions may include entire documents, paragraphs, sentences, phrases, words or some other syntactically or semantically defined unit. Such a unit may serve to encapsulate or serve as a proxy for individual concepts or topics. Theses portions can be hierarchically clustered. By clustering, it is meant herein that for a given corpus, portions (or documents) determined from the corpus will be separated into one or more possibly overlapping groups, called clusters. The term hierarchical indicates that, for certain embodiments, these clusters will be organized into a graph or tree such that if a portion (or document) is a member of a cluster that has a parent in the tree, then the parent cluster also includes the portion (or document). A cluster within the hierarchy is considered a leaf cluster if it is a leaf in the organizational structure, and is considered a parent cluster if the cluster is not a leaf cluster.

The hierarchical clusters of the portions of documents and the associated documents can be utilized to aid in the navigation, analysis, search or other type of review of the documents of the corpus. To further increase the usefulness of such clusters in review of the documents of the corpus, one or more representative snippets or names may be determined for each cluster. A snippet may be a portion of the document (e.g., which may be the same as, or different, than the portions of the cluster) having a rank with respect to that cluster (or the portions comprising the cluster) above some snippet threshold, while a name may be a ranked word, term, phrase or token included in a portion or snippet associated with the cluster. The snippets and names for the hierarchical clusters may be presented by the document analysis system to a user as the user reviews the hierarchical clusters and documents of the corpus using a document analysis system to support the human readability and understanding of the clusters by the users.

Thus, embodiments of systems that utilize the organizational hierarchies disclosed herein may provide relatively more information regarding the clusters and associated documents while grouping documents in a more intuitive way that can have the benefit of revealing the key elements of the corpus in certain circumstances. Accordingly, embodiments allow users to quickly drill-down to relevant and meaningful content or documents within a corpus within a short period of time by leveraging the associated hierarchical clusters and meaningful labels.

Looking now at FIG. 1, a block diagram of one embodiment of a document analysis system employing hierarchical clustering of document portions is depicted. The document analysis system 101 is part of computing environment 100 including a repository 105, document analysis system 101, and one or more client computers 130. Repository 105 may comprise a file server or database system or other storage mechanism remotely or locally accessible by document analysis system 101 which, according to an embodiment, may be almost any SQL or NoSQL platform such as MongoDB, Elasticsearch or the like. Repository 105 may store documents 107 that document analysis system 101 may allow users accessing the document analysis system 101 to review (e.g., navigate, search, tag, etc.).

In the depicted embodiment document analysis system 101 may include one or more (virtual or physical) servers or other type of computing device utilizing a central processing unit 112 connected to a memory and a data store 118 (e.g., via a bus). Central processing unit 112 may represent a single processor, multiple processors, a processor(s) with multiple processing cores and the like. Data store 118 may include a volatile or non-volatile non-transitory storage medium such as RAM, hard disk drives, flash memory devices, optical media or the like. Document analysis system 101 may be connected to a data communications network such as the Internet, a local area network (LAN), a wide area network (WAN), a cellular network or some other network or combination of networks.

Data store 118 stores computer executable instructions 119. Computer executable instructions 119 can represent one or more multiple programs or operating system instructions. In one embodiment, instructions 119 are executable to provide document analysis application 122. Document analysis application 122 may be implemented on the same computing systems or can be distributed across multiple computing systems, platforms or physical or virtual server. Again, it will be noted here that while embodiments described and depicted with respect to FIG. 1 include a deployment of a document analysis system on a physical computing device other embodiments may include the document analysis system deployed as a service on, for example, a cloud computing environment or otherwise deployed without loss of generality.

Client computer system 130 may include components similar to those of the server of document analysis system 101, such as CPU 138 and data store 140. Additionally, client computer system 130 may include executable instructions 132 to provide user interface 134 that allows a user to interact with document analysis system 101 to review the documents 107 of the corpus. These instructions 132 may have, for example, been provided by document analysis system 101 in response to an access by client computer 130. For example, user interface 134 may be provided through a web browser, file system interface or other method without loss of generality. Moreover, user interface 134 may interact (e.g., issue requests, receive responses, etc.) with a corresponding interface 136 of the document analysis application 122, which may be, for example a web services interface, an Application Programming Interface (API) or another type of interface.

Again, those skilled in the art will appreciate that document analysis system 101 shown in FIG. 1 is merely an example of a computing system and embodiments of a document analysis system that may be implemented using other computing systems (e.g., desktop computers, laptops, mobile computing devices, services platforms, cloud computing platforms or other computing devices or platforms with adequate processing and memory) including multiple computers acting together to provide a document analysis system (e.g., a cluster of servers or other computing devices connected by a network acting together to provide the document analysis system). Similarly, client computer 130 may include any suitable desktop computer, laptop, mobile device, server or other computing system.

As discussed, in order to provide a user reviewing the document 107 of the corpus (e.g., through interface 134) topic clustering engine 124 may generate an organizational hierarchy of clusters 103 based on portions of the documents 107 within the corpus. Additionally, topic clustering engine 124 may generate one or more representative snippets 111 and names 109 for clusters of the organizational hierarchy of clusters 103. The hierarchical clusters 103 of the portions of documents 103 along with the snippets 111 and names 109 can be presented to the user through the interface 134 by the document analysis system 101 to aid the user in the navigation, analysis, search or other type of review of the document 107 of the corpus to support the human readability and understanding of the clusters 103 and document 107 by the users.

To illustrate in more detail, in some embodiments, when a document 107 is added to the document analysis system 101, or when documents 107 are processed in a batch format (e.g., at a particular time interval), a document 107 can be provided to text extractor 152 that parses or analyzes the document 107 to determine the text for the document 107. The text can then be stored in association with the document 107 or portion or provided to the topic clustering engine 124. The text extractor 152 may also perform document cleaning of the documents 107, whereby a type of document 107 may be determined and certain data may be stripped or separated from the document 107. For example, if a document 107 is an email or the like, the header information may be stripped from the document 107.

At some point, topic clustering engine 124 will determine that a clustering run should take place. This determination may be made based on the expiration of a certain amount of time (e.g., a clustering interval), the ingest or addition of a threshold number of (e.g., new) documents 107 to the repository or another criteria. It should be noted here that while embodiments may be described as clustering the entirety of the corpus of documents 107 during each clustering run, embodiments may also be effectively utilized to cluster portions or groups of a document corpus (e.g., a group of newer or older documents may clustered separately, documents from different departments of a corporation may be clustered separately, etc.). Moreover, embodiments may also cluster individual or a set of documents (e.g., newly added or ingested documents) between clustering runs based on an existing hierarchy of clusters 103, as will be discussed in more detail at a later point.

When a clustering run occurs, the extant corpus of documents 107 (e.g., the text of the documents 107) will be provided to the topic clustering engine 124. The topic clustering engine 124 will separate each of the documents 107 (e.g., the text of non-empty documents) into a set of portions. These portions may include entire documents, paragraphs, sentences, phrases, words or some other syntactically or semantically defined unit. In one embodiment, for example, sentences may be utilized as the portions, such that each document may be separated into sentences, using, for example, a set of sentence delimiters such that each document may be split into portions by separating the text of the document on the characters of the sentence delimiters. The set of sentence delimiters may, for example, be language specific (e.g., there may be a first set of sentence delimited for English, a second set for French, a third set for Japanese, etc.). In these types of embodiments, once the language of a document or portion of a document is identified, the sentence delimiters associated with the identified language may be utilized to separate that document (or portion of document) into corresponding sentences. Alternatively, a master set of sentence delimiters may be utilized for all documents in all languages, or other configurations may be utilized.

The portions extracted from each document may then be stored in the repository in association with the document 107 from which they were extracted. Other data associated with the portion or document may also be stored in the repository, including, for example, a portion's position (e.g., in characters) within the document 107 from which it was extracted, an index indicating the portion's order in the document with respect to the other portions of that document or a language identified for the portion (the portion language). Thus, each (e.g., non-empty) document 107 is associated with a set of ordered portions extracted from that document 107 (e.g., where the ordered portions recapitulate, or with the inclusion of the appropriate separators, could be used to reconstitute, the document 107).

Once the portions of the document 107 in the corpus are extracted, the topic clustering engine 124 may determine the tokens of the portions and cluster these portions to determine hierarchical clusters of portions 103. In one embodiment, the topic clustering engine 124 may implement a filter to separate portions to cluster (referred to as clusterable portions) from portions which are to be excluded from the clustering (referred to as an unclusterable portion). This filter may utilize almost any criteria or combination of criteria desired, including for example, number of characters or tokens in a portion, the types of characters or tokens in a portion, an amount of known characters or tokens in a portion, the presence of patterns or regular expressions in a portion, or other criteria.

The topic clustering engine 124 can then embed the portions of the documents (e.g., those identified as clusterable or all the portions) to generate a portion embedding vector for each portion. Embedding is a method of converting sets of discrete objects into points within a space and serves to quantify or categorize semantic similarities between linguistic items based on their distributional properties in large samples of language data. Accordingly, the portion embedding vector generated for a portion may represent the semantics of that portion regardless of the language or syntax utilized in the portion. The portion embedding vector generated for a portion may be stored in repository 105 in association with that portion. For example, the document repository system 101 may include or reference a repository of cross-lingual word embedding vectors such as the FastText embeddings provided by Project Muse (Multilingual Unsupervised and Supervised Embeddings). Other types of embeddings may also be utilized without loss of generality, including for example Word2Vec, GloVE, BERT, ELMO or the like). In this manner, regardless of the language of the portion that portion can be converted to a common representation of the semantics of the topics or concepts of that portion.

The topic clustering engine can thus map each portion (or the tokens thereof) to the list of word embedding vectors to produce the portion embedding vector for the portion. The word embedding vector may be of a dimension (e.g., number of integers) that may be user configured or empirically determined. This mapping may be done, for example, by mapping each token (or each of a determined subset of the tokens) of the portion to a vector in the word embedding vectors to determine a vector for each token of the portion, and utilizing that vector to generate the portion embedding vector according to the order the tokens occur in the portion. In one specific embodiment, the topic clustering engine 124 can utilize SIF to generate a portion embedding vector by generating a pre-embedding vector for the portion and adjusting the pre-embedding portion for the vector using an embedding adjustment vector determined for the corpus of documents 107. Examples of SIF used in sentence embeddings are presented in *A Simple but Tough-to-Beat Baseline for Sentence Embeddings*, by Sanjeev Arora, Yingyu Liang, Tengyu Ma, presented in the International Conference on Learning Representations (ICLR), 2017, incorporated herein fully by reference for all purposes. As discussed, other types of embeddings may also be used in particular embodiments. Examples of such embeddings include *StarSpace: Embed All The Things* by Ledell Wu et al (2017 arXiv:1709.03856 [cs.CL]); *Deep Contextualized Word Representations* by Matthew E. Peters et al (2018 arXiv:1802.05365 [cs.CL]; *GLoVE: Global Vectors for Word Representation* by Jeffrey Pennington et al (2014) and *Distributed Representations of Words and Phrases their Compositionality* by Tomas Mikolov (2013 arXiv1210.4546[cs.CL]) all of which are incorporated herein fully by reference for all purposes.

The topic clustering engine 124 can then perform hierarchical clustering on the (e.g., clusterable) portions (referred to as a clustering universe) based on the portion embedding vector associated with each portion to determine hierarchical clusters of portions 103. This clustering may be accomplished utilizing almost any hierarchical clustering tools or methodology desired, including, for example, recursive application of k-means clustering (e.g., as implemented in scikit), agglomerative clustering, or convex clustering.

In one embodiment for example, recursive k-means clustering may be utilized by first determining a set of initial clusters by applying k-means clustering to the clustering universe (e.g., initially the portion embedding vectors for all the portions) to generate a set of (e.g., non-overlapping) clusters of the portions. When determining the clusters, the topic clustering engine 124 may assign each portion to a cluster based on the distance between the portion embedding vector of the portion and the centroid of each determined cluster. For example, the topic clustering engine 124 may assign a portion to exactly one cluster, namely, the cluster with the centroid closest to the portion embedding vector corresponding to the portion. Additionally, the topic clustering engine 124 may be configured with a minimum or maximum cluster number such that the number of initial clusters produced is at least the minimum number, and at most the maximum number, of clusters.

For each of the determined initial clusters, the topic clustering engine 124 determines a cluster centroid (also known as just the centroid) which is a vector whose number of dimensions is equal to the number of dimensions in the portion embedding vectors of the portions being clustered. The topic clustering engine 124 can also determine the number of documents for which at least one constituent portion is contained in the cluster; this is the number of constituent documents of that cluster. Each of the initial clusters is then stored in the repository 105 (e.g., as part of the hierarchy of clusters 103), where each cluster is associated with the cluster centroid for the cluster, the portions assigned to that cluster, and the number of constituent documents of that cluster.

To generate any remaining clusters of the hierarchy 103, the topic clustering engine 124 may then recursively apply k-means clustering to each of the previously determined clusters (e.g., initially the first recursive application of clustering is applied to the determined initial clusters, the second recursive application of clustering is applied to the clusters determined from the first recursive application of clustering, etc. until a termination criteria is reached).

In one embodiment, for example, during each application of clustering, each of the set of clusters generated in a previous application of clustering may be evaluated to determine if that cluster has a number of constituent documents exceeding a minimum parent document count and if a traversal path from a root node or cluster of the organizational hierarchy 103 to that cluster is not greater (e.g., or equal) to a maximum depth. If these conditions are met that cluster may be deemed a parent cluster. Alternatively, if the cluster has a number of constituent documents less than (e.g., or equal) to the minimum parent document count or if a traversal path from a root node or cluster of the organizational hierarchy 103 to that cluster is greater (e.g., or equal) to a maximum depth, that cluster may be deemed a leaf cluster.

For each of the determined parent clusters, clustering can then be applied to that parent cluster by utilizing the portion embedding vectors for the portions assigned to that parent cluster as the clustering universe, and applying k-means clustering to that clustering universe to generate a set of (e.g., non-overlapping) clusters of the portions of that parent cluster. Each cluster resulting from the clustering of a parent cluster (referred to as potential child clusters) is associated with its cluster centroid and the number of documents for which at least one constituent portion is contained in the cluster (the number of constituent documents of that cluster). Each potential child cluster can then be evaluated to determine if it should be stored as part of the organizational hierarchy 103.

Specifically, in one embodiment it can be determined if the number of constituent documents 107 of the potential child cluster is greater than some minimum leaf document count. In one embodiment, only if all of the potential child clusters have a number of constituent documents 107 greater than the minimum leaf document count will the set of potential child clusters be deemed accepted clusters and stored as a child of the parent cluster (e.g., from which it was derived) in the hierarchy of clusters 103 and associated with the cluster centroid for the cluster, the portions assigned to that cluster, and the number of constituent documents of that cluster. Alternatively, each potential child cluster for which the number of constituent documents 107 is greater than the minimum leaf document count will be deemed an accepted cluster and stored as a child of the parent cluster (e.g., from which it was derived) in the hierarchy of clusters 103 and associated with the cluster centroid for the cluster, the portions assigned to that cluster, and the number of constituent documents of that cluster. The recursive clustering can then be applied to each of these accepted clusters and the recursive clustering continued until there are no clusters in the hierarchy 103 that have a number of constituent documents exceeding a minimum parent document count and a traversal path from a root node or cluster of the organizational hierarchy 103 to that cluster greater (e.g., or equal) to a maximum depth.

Moreover, each of the documents 107 may be assigned to one or more clusters of the organizational hierarchy (e.g., to cluster the documents 107). In one embodiment, a document 107 may be associated with a cluster of the organizational hierarchy 103 if at least one (clusterable) portion of that document is associated with that cluster. It will be realized then, that a single document 107 may be associated with none of the clusters of the organizational hierarchy 103 (e.g., if the document included no clusterable portions), a single cluster of the organizational hierarchy 103 or multiple clusters of the organizational hierarchy 103. It will be noted that this document assignment may occur as the clustering of the portions to determine the hierarchical organization 103 is occurring or as a separate standalone process.

After the topic clustering engine 124 performs a clustering run then hierarchical clusters of portions 103 are stored in the repository 105, where the clusters including one or more overlapping groups of portions are organized into a graph (e.g., a tree) such that if a portion is a member of a cluster that has a parent in the graph, then the parent cluster also includes the portion. Each of the clusters in the hierarchical clusters 103 is associated with the cluster centroid for the cluster, the portions assigned to that cluster, and the number of constituent documents of that cluster.

Once the organizational hierarchy 103 is determined, the topic clustering engine 124 can generate representative snippets 111 and names 109 for those clusters (e.g., to support the human readability and understanding of the clusters by the users). Snippets 111 associated with a cluster may be ranked portions assigned to that cluster of a sufficiently high ranking. To determine snippets for a cluster then, in certain embodiments the portions assigned to the cluster (or a subset thereof) may be ranked and ordered according to rank such that a top number of portions may be utilized as snippets for that cluster. There may be a different number of these snippets utilized in different contexts. There may, for example, be a reporting snippet number describing a number of snippets to report for a cluster when a user accesses or interact with the organizational hierarchy 103 (e.g., which may default to all assigned portions), or a storing snippet number describing a number of snippets to store for a cluster in the organizational hierarchy 103 (e.g., which may default to all assigned portions).

These snippets 111 may be determined differently for different types of clusters within the organizational hierarchy 103. For example, to determine snippets 111 for a leaf cluster of the organizational hierarchy 103 the topic clustering engine 124 may rank order all portions assigned to the leaf cluster according to the Euclidean distance of the portion embedding vector of that portion to the centroid of that cluster, with portions having smaller distances ranked higher than those having larger distances. The rankings of each portion of the leaf cluster may be stored in association with that leaf cluster and portion. The topic clustering engine 124 can then associate or identify the top-ranked portions for the cluster to that cluster in the organizational hierarchy 103 as that cluster's snippets 111 (e.g., or a number of the top-ranked portions up to the reporting snippet number or storing snippet number). In one embodiment, when determining these snippets 111 any portions having a language other than a default language for the corpus of documents 107 or topic clustering engine 134 (e.g., English) may be ignored.

To determine the snippets 111 for parent clusters in the organizational hierarchy 103, in one embodiment, the topic clustering engine 124 aggregates all snippets 111 from the children clusters of that parent cluster and rank orders these snippets 111 according to the Euclidean distance of the portion embedding vector for each snippet (portion) to the centroid of the parent cluster (again with portions having smaller distances to the centroid of the parent cluster ranked higher than those having larger distances). Other embodiments may use other (or additional) metrics to rank order the snippets 111, such as cosine similarity of the portion embedding vector for each snippet to the parent cluster. The topic clustering engine 124 can then associate the snippets 111 of the child clusters to the parent cluster in a round-robin fashion by selecting the top-ranked (with respect to the parent cluster's centroid) snippet 111 of each child cluster as the first set of snippets for the parent cluster, and then taking the next highest ranked snippet of each child cluster as the second set of snippets for the parent cluster, and associating these in the same way, until all such snippets of all child clusters are exhausted or until a number of snippets to store for the cluster is fulfilled. The topic clustering engine 124 can then associate or identify the selected portions for the cluster to that cluster in the organizational hierarchy 103 as that cluster's snippets 111 (e.g., ranked in the method just described).

To generate names 109 for a cluster of the organizational hierarchy 103 the topic clustering engine 124 may extract terms from the portions associated with that cluster and associate these extracted terms with the cluster as names 109 of the cluster. The portions from which these terms are extracted may be subset of the portions associated with the cluster, such as the snippets 111 associated with that cluster. In particular, according to certain embodiments, the extracted terms may be scored and ranked such that a top number of the terms may be utilized as names 109 for that cluster. The topic clustering engine 124 may thus be configured with a reporting name number describing a number of names to report for a cluster when a user accesses or interact with the organizational hierarchy, or a storing name number describing a number of names to store for a cluster in the organizational hierarchy 103.

In one specific embodiment, the terms extracted to determine the names 109 for a cluster may be based on one or more linguistic categories. Thus, in certain embodiments, the topic clustering engine 124 includes a configurable list of linguistic categories to be extracted from portions associated with a cluster, including for example nouns, verbs, or noun phrases. Accordingly, after the organizational hierarchy 103 is determined, the topic clustering engine 124 can extract each of the configured linguistic categories from one or more portions associated with each cluster. For example, the topic clustering engine 124 may extract all terms identified as the configured linguistic categories from among the snippets associated with that cluster. This extraction may be performed using, for example, a natural language processing (NLP) tool or library such as SpaCy or the like.

For each extracted term of a linguistic type, the topic clustering engine 124 may generate an embedding vector. The generation of an embedding vector may use the same, or different, processes or methods for generating the portion embedding vectors for the portions of the documents as described above. In one embodiment, for terms that are a single word, a term embedding vector may be determined from the repository of word embeddings used to generate portion embedding vectors, while for terms that are multi-word phrases, the term embedding vector for the term may be an average of each component of the word embedding vectors for the constituent words of the phrase. The topic clustering engine 124 can then rank the extracted terms based on a score for each term determined between a snippet centroid for the cluster (e.g., the cluster for which the names are being determined) and the term embedding vector of that term. This score may be a similarity measure such as a cosine similarity or the like. A snippet centroid for a cluster 711 can be determined by a term ranker based on a raw portion embedding vector associated with each of the snippets of the cluster. This raw portion embedding vector for a snippet may be stored in association with the snippet during the determination of the portion embedding vector for the snippet or, alternatively, may be determined for the snippet from a list of word embedding vectors such that each component of the raw embedding vector is equal to the unweighted average of the corresponding components in the list of the word embedding vectors for the snippet. Based on the score for each term, the terms can be ranked and a top-ranked number of terms (e.g., of each linguistic category) may be selected and stored as the names 109 for the cluster (e.g., with a number of names stored not to exceed the storing name number).

The topic clustering engine 124 may also apply one or more filters to the set of extracted terms. These filters may filter the set of extracted terms according to almost any criteria desired. As an example of such filters, for each linguistic category, the topic clustering engine 124 may filter the ranked list of terms to remove variant spellings, grammatical forms, or terms that vary only in punctuation, keeping only the top-ranked spelling, grammatical form, or punctuation variety. As another example of a filter, for each linguistic category, the topic clustering engine 124 may remove any term in the extracted terms that has a punctuation character or any term that is included, or whose lemma is included, in a (e.g., configurable) blacklist of terms not to be included. Such lemmas can be produced, for example, by using an NLP tool such as SpaCy.

In one specific embodiment, before the terms are ranked and selected as names the topic clustering engine 124 may apply a balance factor to the similarity score for each term to weight the similarity score for the term. In one instance, a balance factor can be determined for each linguistic category and applied to the terms associated with that linguistic category. As another example, a specific balance factor may be determined for each cluster and for each linguistic category based on the depth or height of the cluster within the organizational hierarchy 103. When determining names 109 for a particular cluster, the balance factor associated with both that cluster and the linguistic category of the term may be applied to the score for that term to weight the score according to the applicable balance factor. Based on the (adjusted) score for each term, the terms can be ranked and a top-ranked number of terms (e.g., of each linguistic category) may be selected and stored as the names 109 for the cluster.

As noted above, the documents 107 of the corpus are associated with the clusters of the organizational hierarchy 103, thus as a user navigates the organization hierarchy 103 (e.g., using interface 134), the user may be presented with the ability to view or access documents associated with each cluster. The snippets 111 or names 109 can also be presented to the user through the interface 134 by the document analysis system 101 in association with the hierarchical clusters 103 to aid the user in the navigation, analysis, search or other type of review of the document 107 of the corpus by increasing the human readability and understanding of the clusters 103 and documents 107 by the users. In order to further aid the usefulness of the organizational hierarchy 103 in the review of document 107, however, it may also be desired to rank or order clusters with respect to each document (e.g., which clusters are more meaningful with respect to a document) and to rank or order the documents that are associated with a cluster.

To determine a ranking of clusters for a particular document, the topic clustering engine 124 may determine a ranked list of clusters with which the document is associated. The clusters ranked for a document 107 may be limited in some cases to a subset of the clusters of the organizational hierarchy 103, such as the parent clusters or the leaf clusters. In one particular embodiment, the topic clustering engine 124 may determine a ranked list of leaf clusters with which the document is associated. In particular, for each document containing at least one (clusterable) portion and for each leaf cluster of the organizational hierarchy 103 with which the document is associated, the topic clustering engine 124 can compute a document portion metric representing an amount (e.g., a percentage) of portions of the document that are members of that leaf cluster. Additionally, for each leaf cluster, the topic clustering engine 124 can determine a leaf cluster metric representing an amount (e.g., a percentage) of documents 107 of the corpus that include at least one (clusterable) portion that is associated with that leaf cluster.

Thus, for each document containing at least one (clusterable) sentence and for each leaf cluster of the organizational hierarchy 103 with which the document is associated, the topic clustering engine 124 may determine an (e.g., a salience-weighted) importance of the leaf cluster with respect to the document by dividing the document portion metric by the leaf cluster metric. The topic clustering engine 124 can then rank the leaf clusters with which each document is associated according to the salience-weighted importance, with higher values given higher rank. The ranking of each leaf cluster associated with the document 107 can then be stored in the repository 105.

The topic clustering engine 107 may also determine a ranking of the documents associated with a particular cluster with respect to that cluster. This ranked list of documents 107 for a cluster can be determined based on the ranked list of portions associated with that cluster (e.g., as determined when determining snippets for the cluster). The ranked list of portions for the cluster may be iterated through starting at the highest ranking portion. For each portion, the document associated with that portion may be determined and, if not already included in the list, added as the next highest ranking document to the ranked list of documents for that cluster. Thus, the document 107 associated with the highest ranking portion associated with the cluster will be the highest ranked document in the ranked list of documents for that cluster, the document 107 associated with the second highest ranking portion associated with the cluster (if different from the highest ranking document) will be the second highest ranked document in the ranked list of documents for that cluster, etc. The determined ranking of the documents 107 associated with the cluster can then be stored in the repository 105 in association with the documents 107 and the cluster of the organizational hierarchy 103.

Thus, as a user navigates the organizational hierarchy 103 or reviews the documents 107 of the corpus (e.g., using interface 134), the user may be presented with the ability to view or access documents 107 associated with each cluster of the organizational hierarchy 103 and to perform analysis of such documents 107. The snippets 111 or names 109 can also be presented to the user through the interface 134 by the document analysis system 101 in association with the hierarchical clusters 103 along with the rank or order of clusters of the organizational hierarchy 103 with respect to each document and the rank or order of documents 107 associated with the clusters of the organizational hierarchy 103. Such information aids the user in the navigation, analysis, search or other type of review of the documents 107 of the corpus.

More generally, the organizational hierarchy 103 can be used by document analysis systems and their users for a variety of ends. For example, in some embodiments, each (or multiple) clusters of the organizational hierarchy 103 may be used to filter a list of documents (e.g., or portions, snippets, etc.), including for example the results of a search query, to produce a filtered list of documents containing exactly those documents that are both contained within the initial list and assigned to the cluster.

Similarly, in certain embodiments, a list of documents (e.g., or portions, snippets, etc.) may be used to prune the cluster hierarchy 103 in order to generate a pruned cluster hierarchy such that each cluster in the initial cluster hierarchy including at least one document in the list corresponds exactly to one cluster in the pruned hierarchy for which the assigned documents are exactly those documents assigned to the cluster in the initial hierarchy that are also contained in the list. Furthermore, those clusters in the initial cluster hierarchy to which no documents in the list of documents have been assigned may have no corresponding cluster in the pruned cluster hierarchy, and every cluster in the pruned hierarchy may have exactly one corresponding cluster in the initial hierarchy. The parent-child relationships of clusters in the pruned cluster hierarchy may also match the parent-child relationships of the corresponding clusters in the initial cluster hierarchy exactly.

When a list of documents is used to prune an initial cluster hierarchy as discussed, in one embodiment the snippets of the clusters (e.g., of the pruned hierarchy) may be filtered to reflect this pruning by creating a ranked list of snippets for a cluster of the pruned hierarchy from the ranked list of snippets for the corresponding cluster in the initial cluster hierarchy such that the ranked list for the cluster of the pruned hierarchy includes only snippets drawn from documents within the list of document used to prune the initial cluster hierarchy.

Additionally, in some embodiments, the names of the clusters of the pruned hierarchy may also be filtered to reflect the pruning by creating a ranked list of names for a cluster of the pruned hierarchy from the ranked list of snippets for the corresponding cluster in the initial cluster hierarchy such that the ranked list for the cluster of the pruned hierarchy includes only names drawn from the portions of documents within the list of document used to prune the initial cluster hierarchy.

Briefly then, it may be useful to an understanding of embodiments to illustrate an example with respect to a specific document. Therefore FIG. 2A depicts an email that may be used to discuss such an example. Given email 280, embodiments as disclosed may extract portions 282a, 282b, 282c from the email. These portions may be representative or a good proxy for single ideas or treated as such. Document portions 282 extracted from document 280 will be clustered into an organizational hierarchy based on portions similarly extracted from documents across a corpus as described. FIG. 2B represents the clustering of the embeddings of portions 282 from the above example and one level of clustering. These portions of clusters may be ranked and a certain number of them selected as snippets for the cluster. Thus, for example, portion 282a "This week we'll be revisiting the customer pricing strategy for the Americas", may be clustered with portions from across the corpus and selected as a snippet with other portions such as "We need to review the pricing strategy as we expand internationally", "What we decide to ask our clients to pay must vary from country to country", "We can't beat all the competitors in this region by pricing alone, but I don't think we have to", "Where are the pricing numbers for next week's big thing? We need to pull Jesse in on this" or "but it could be true that next time we change the cost we should notify this type of client since they'll have it in their agreement that they can walk." From the cluster, words or phrases may be extracted and filtered or ranked to produce names for the cluster. For this example, such name may be for instance "customer pricing strategy, competitors, internationally, cost, charge" among others.

Figure 2C:
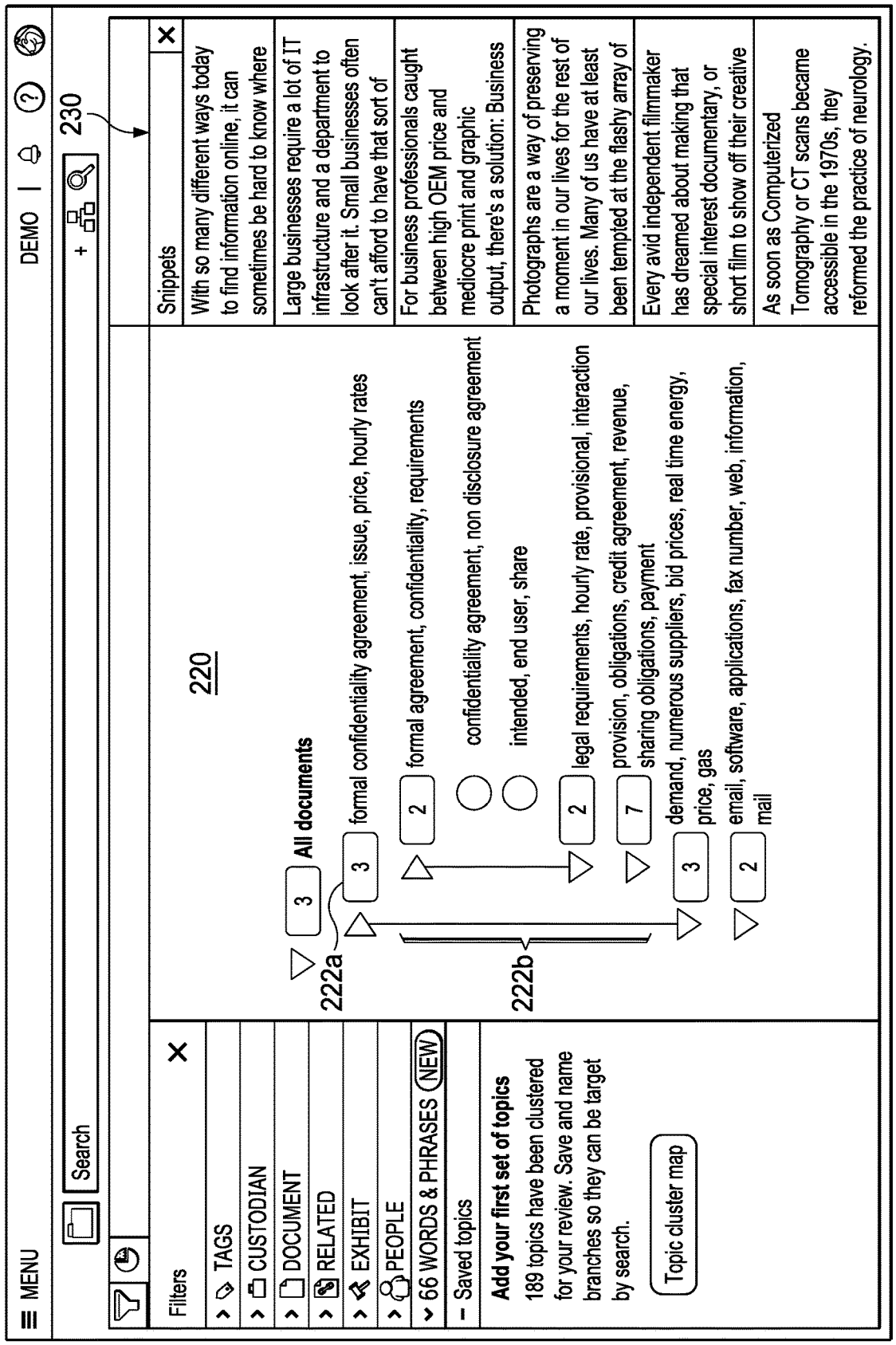

It will also be useful here to illustrate embodiments of interfaces that may be utilized to present such an organizational hierarchy to users. FIG. 2C depicts one such embodiment of an interface that may be used to present an organizational hierarchy associated with a corpus of documents to a user. Area 220 of the interface 200 depicts an organizational hierarchy of clusters of a corpus of documents as an indented list. Here, 189 topics or clusters have been determined for the corpus. Each of the initial or root clusters is displayed in the indented list in area 220, along with the names selected for that cluster. A user can interact with the list of clusters presented in area 220 to "expand" a parent cluster to see the children clusters of that parent cluster. In the example interface, the user has interacted with parent cluster 222a to see the children clusters 222b. Area 230 depicts snippets associated with the cluster or clusters selected in area 220.

FIG. 2D depicts an embodiment of an interface that may be utilized to conceptually present clusters within the hierarchy as columns. Here, each box represents a cluster 250 and includes the names selected for that cluster 250. Child clusters 250 are placed to the right of their respective parent clusters 250 in the hierarchy and within the height dimension of the respective parent cluster 250. Thus, in "Level 1" are the initial or root clusters 250a in the organizational hierarchy, "Level 2" includes clusters 250b that are children of the root clusters 250a, and "Level 3" includes clusters 250c that are children of the "Level 2" clusters 250b, etc. Thus, for example, clusters 250b1, 250b2 and 250b3 in "Level 2" are all children clusters of parent cluster 250a1 in "Level 1" and clusters 250c1 and 250c2 are children clusters of parent cluster 250b1 in "Level 2".

With that above discussions in mind, specific embodiments of components of a document analysis system may now be discussed in more detail. Generally, embodiments of a topic clustering engine of a document analysis system may include four functional components (where embodiments may include fewer or more components), including (1) document preprocessing to produce portion embeddings and associate the portion and associated embeddings with documents; (2) hierarchical clustering on the portions (using the portion embeddings) to generate an organizational hierarchy of clusters of those portions (e.g., a graph of clusters); (3) extraction of names and snippets from clusters; and (4) document assignment to determine document clusters from the portion clusters, to associate documents to clusters, or to provide rankings of documents with respect to clusters or clusters with respect to documents.

Figure 3:
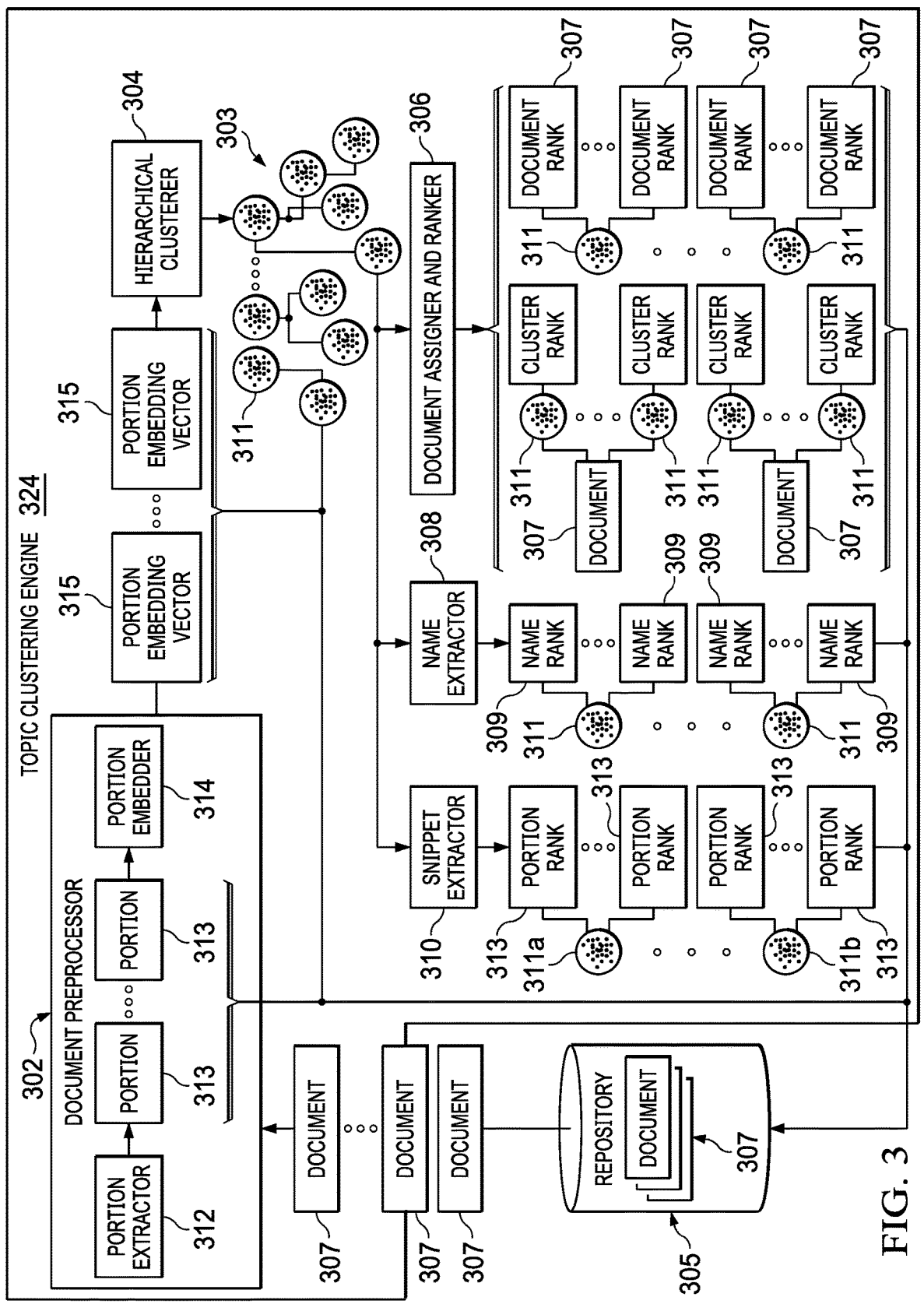
FIG. 3 is a block diagram of one embodiment of a topic clustering engine for use in a document analysis system.

Moving to FIG. 3, then, one embodiment of a topic clustering engine 324 is depicted. Documents 307 may be added to a document analysis system as single documents 307 or as a batch by users of a document analysis system. For example, in a litigation context a set of documents produced by a party or otherwise obtained may be loaded or stored into repository 305. Thus, these documents 307 may be processed by the document analysis system in a batch format (e.g., at a particular time interval) or as single document 307. Documents 307 stored in repository 305 may include the full text of the document 307, a subset of the full text of the document 307 or a sequence of tokens extracted from the text of the document 307.

At some point, topic clustering engine 324 will determine that a clustering run should take place. This determination may be made based on the expiration of a certain amount of time (e.g., a clustering interval), the ingest or addition of a threshold number of (e.g., new) documents 307 to the repository or another criteria. In one embodiment, the topic clustering engine 324 will perform an initial clustering run during, or substantially immediately after, an initial document ingest. A clustering run may include portion preprocessing, hierarchical clustering, naming and snippet extraction, and document assignment and ranking as described above. At the time of each clustering run, the topic clustering engine 324 may store the number of documents 307 available, the time at which the clustering run begins, and the time at which the clustering run ends.

Thus, for example, the topic clustering engine 324 may track a number of documents 307 added to the corpus or otherwise ingested since a time of a previous clustering run. The topic clustering engine 324 may maintain a clustering run threshold comprising, in particular embodiments, a (e.g., configurable) percentage (e.g., 10%, 25%, etc.). This percentage may represent a percentage increase in the number documents 807 since a time (e.g., a starting time or an ending time) of a previous clustering run that will trigger another clustering run. Accordingly, once the number of documents 307 added to the corpus since the time of the previous clustering run exceeds the clustering run threshold (e.g., the increase percentage) a clustering run may be triggered by the topic clustering engine 324.

When a clustering run occurs, the extant corpus of documents 307 (e.g., the text or tokens of the documents 307) will be provided to the topic clustering engine 324. Specifically, the documents 307 will be provided to a document preprocessor 302. The document preprocessor 302 includes portion extractor 312 that will separate each of the (e.g., non-empty) documents 307 into a set of portions 313. These portions may include entire documents, paragraphs, sentences, phrases, words or some other syntactically or semantically defined unit. In one embodiment, for example, sentences may be utilized as the portions, such that each document may be separated into portions 313 comprising sentences.

The portions 313 extracted from each document may then be stored in the repository 305 in association with the document 307 from which they were extracted. Thus, each document 307 is associated with a set of ordered portions 313 extracted from that document 307. Once the portions 313 of the documents 307 in the corpus are extracted, the portion embedder 314 then embeds the portions 313 of to generate a portion embedding vector 315 for each portion 313. For example, the topic clustering engine 324 may include, or reference, a repository of cross-lingual word embedding vectors such as the FastText embeddings provided by Project Muse (Multilingual Unsupervised and Supervised Embeddings). Other types of embeddings may also be utilized without loss of generality. The portion embedding vector 315 generated for a portion 313 may be stored in repository 305 in association with that portion 313.

These portion embedding vectors 315 may also be provided to hierarchical clusterer 304 which clusters portions 313 based on portion embedding vectors 315 to generate organizational hierarchy 303 comprising clusters 311 of portions 313. This clustering may be accomplished utilizing almost any hierarchical clustering tools or methodology desired. In one embodiment for example, recursive clustering may be utilized by first determining a set of initial clusters by applying clustering to a clustering universe initially comprising the portions (e.g., including the portion embedding vectors) for all the portions 313 to generate the set of initial clusters 311 of the portions 313. In certain embodiments, the hierarchical clusterer 304 may be configured with a minimum or maximum cluster number such that the number of initial clusters produced is at least the minimum number, and at most the maximum number of clusters. Each of the initial clusters 311 is then stored in the repository 305 (e.g., as part of the hierarchy of clusters 303).

To generate any remaining clusters 311 of the hierarchy 303, the hierarchical clusterer 304 may then recursively apply clustering to each of the previously determined clusters using that cluster's associated portions 313 as the clustering universe until a termination criteria is reached (e.g., initially the first recursive application of clustering is applied to the determined initial clusters 311, the second recursive application of clustering is applied to the clusters 311 determined from the first recursive application of clustering, etc.). Each resulting child cluster 311 can be stored as a child of the parent cluster (e.g., from which it was derived) in the hierarchy of clusters 303 in repository 305.

Once the organizational hierarchy 303 of clusters 311 of portions 313 is determined snippet extractor 310 may rank the portions 313 assigned to each cluster 311 and order the portions 313 according to rank such that a top number of portions 313 may be utilized as snippets for that cluster 311. These snippets 111 may be determined differently for different types of clusters 311a, 311b within the organizational hierarchy 103. The rankings of each portion 313 of the cluster 311 may be stored in association with that cluster 311 and portion 313 in repository 313. The snippet extractor 310 can then associate or identify a number of the top-ranked portions 313 for the cluster to that cluster in the organizational hierarchy 303 as that cluster's 311 snippets Name extractor 308 can also generate names 309 for each of the clusters 311 of the organizational hierarchy 303 of clusters 311. To generate names 309 for a cluster 311 of the organizational hierarchy 303 the name extractor 308 may extract terms from the portions 313 associated with that cluster 311 and associate these extracted terms with the cluster 311 as names 309 of the cluster. The portions 313 from which these terms are extracted may be subset of the portions 313 associated with the cluster, such as the snippets (e.g., as determined by snippet extractor 310) associated with that cluster 311. In particular, according to certain embodiments, the extracted terms may be scored and ranked according to score such that a top ranked number of the terms may be utilized as names 309 for that cluster 311 and stored as the names 309 for the cluster 311 in the repository 305 (e.g., with a number of names stored not to exceed the storing name number).

Once the organizational hierarchy 303 is determined, document assigner and ranker 306 may assign documents 307 to one or more clusters 311 of the organizational hierarchy 303. In one embodiment, a document 307 may be associated with a cluster of the organizational hierarchy 303 if at least one (clusterable) portion 313 of that document 307 is associated with that cluster 311. Moreover, document assigner and ranker 306 may determine a ranking of clusters 311 for a particular document 307 associated with those cluster 311. The clusters 311 ranked for a document 307 may be limited in some cases to a subset of the clusters of the organizational hierarchy 303, such as the parent clusters or the leaf clusters. The clusters 311 associated with each document 307 and the rankings of the clusters 311 associated with each document 307 may then be stored in repository 305

Additionally, document assigner and ranker 306 may also determine a ranking of documents 307 within clusters 311 of the hierarchy 303 with respect to that cluster 311. This ranking of documents 307 for a cluster 311 can be determined based on the ranking of portions 313 associated with that cluster 311 (e.g., as determined when determining snippets for the cluster 311 by snippet extractor 310) such that the ranking of documents 307 with respect to the cluster 311 corresponds to the ranking of portions 313 of those document 307 with respect to the cluster 311. The determined ranking of the documents 307 associated with each cluster 311 can then be stored in the repository 305 in association with the documents 307 and the cluster 311 of the organizational hierarchy 303.

Figure 4A:
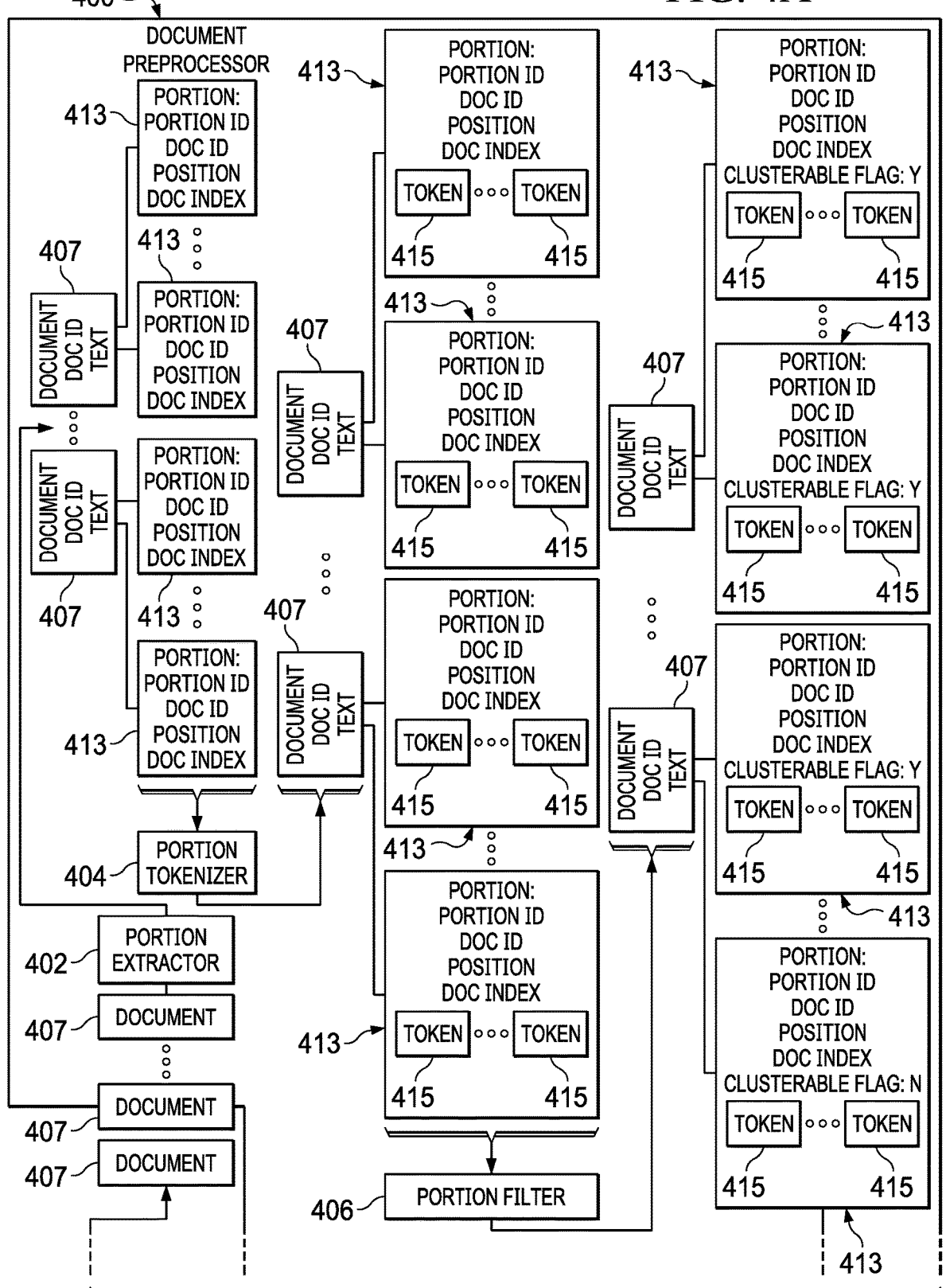
FIGS. 4A and 4B are a block diagram of one embodiment of a document preprocessor for use with embodiments of a topic clustering engine.
Figure 4B:
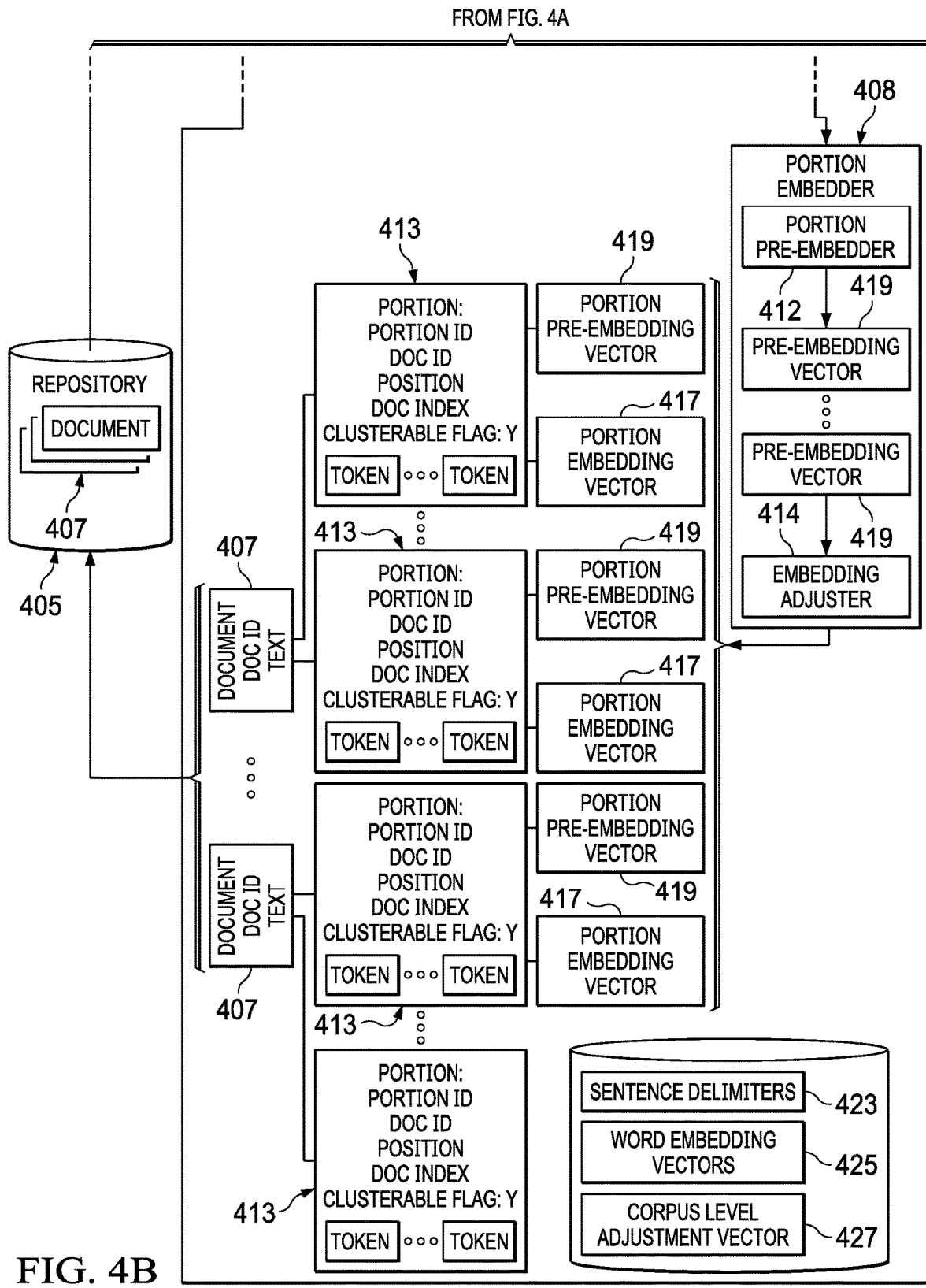

It will now be illustrative to discuss particular embodiments of components of a topic clustering engine in more detail. Moving on to FIGS. 4A and 4B then, one embodiment of a document preprocessor that may be utilized by a topic clustering engine is depicted. Document 407 in the repository 405 will be obtained by portion extractor 402. Each of the documents 407 may be associated with document identifier (ID) and the text corresponding to the document 407. Additionally, the tokens of the document 407 may be provided along with the document 407. Alternatively, the tokens of the document 407 may be determined at a later point.

The portion extractor 402 separates each of the documents 407 (e.g., the text of non-empty documents) into a set of portions. These portions may include entire documents, paragraphs, sentences, phrases, words or some other syntactically or semantically defined unit. In one embodiment, for example, sentences may be utilized as the portions, such that each document may be separated into sentences (e.g., substantially corresponding to a linguistic sentence), using, for example, a set of sentence delimiters 423 such that each document may be split into portions by separating the text of the document 407 on the characters of the sentence delimiters 423. The sentence delimiters 423 may be a comprehensive list of Unicode characters comprising substantially all sentence delimiting punctuation across the scripts contained within Unicode.

The document preprocessor 400 (or the topic clustering engine of which it is a part) may support multiple languages with one language being designated (e.g., by configuration or user selection) a "default" language for the corpus of documents 407. The set of sentence delimiters 423 may thus be language specific (e.g., there may be a first set of sentence delimiters 423 for English, a second set of delimiters 423 for French, a third set of delimiters 423 for Japanese, etc.). In these types of embodiments, once the language of a document 407 or portion 413 of a document 407 is identified by the portion extractor 402, the sentence delimiters 413 associated with the identified language may be utilized to separate that document 407 (or portion 413 of document 407) into corresponding sentences. Alternatively, a master set of sentence delimiters 423 may be utilized for all documents in all languages, or other configurations may be utilized.

The portions 413 extracted from each document may then be stored in the repository 405 in association with the document 407 from which they were extracted. Other data associated with the portion 413 or document 407 may also be stored in the repository 405, including, for example, an identifier of the document 407 from which it was extracted, a portion's position (e.g., in characters) within the document 407 from which it was extracted, an index (e.g., "Doc Index") indicating the portion's order in the document 407 with respect to the other portions of that document 407, or a language identified for the portion (the portion language). Thus, each (e.g., non-empty) document 407 is associated with a set of ordered portions 413 extracted from that document 407 (e.g., where the ordered portions 413 recapitulate, or with the inclusion of the appropriate separators, could be used to reconstitute, the document 407).

Once the portions 413 of the document 407 in the corpus are extracted, the portion tokenizer 404 may determine a set of tokens 415 for each portion 413. A token 415 may be a sequence of characters corresponding substantially to the linguistic concept of a word or the computational concept of a token. For each portion 413, portion tokenizer 404 may separate the portion 413 into a list of tokens 415 which, when concatenated with the appropriate separators, recapitulates the portion 413 in order. The set of tokens 415 can be determined by splitting the text of the portion 413 on whitespace and punctuation characters. Each token 415 may have at least one character that is neither whitespace nor punctuation, and the portion tokenizer 404 may exclude any tokens not satisfying this requirement from the list of tokens 415. In some embodiments, a configurable minimum or maximum number of characters per token 415 (e.g., which may default to 2 and 15 respectively) is utilized by portion tokenizer 404 when separating portions 413 into a list of tokens 415 to exclude tokens with a number of characters less than the minimum or greater than the maximum from the list of tokens 415 for that portion 413. Thus for portions in languages supported by the document preprocessor or topic clustering engine (e.g., English, French, German, Spanish, Portuguese, Chinese, Japanese, Korean) for portions entirely in one language the list of tokens 415 for the portion 413 may correspond with high likelihood to the list of linguistic words of the portion 413. The list of tokens 415 generated for each portion 415 can thus be stored in association with the respective portion 413 in repository 405.

In one embodiment, the document preprocessor 400 may also include portion filter 406 that may implement a filter to separate portions to cluster (referred to as clusterable portions) from portions which are to be excluded from the clustering (referred to as unclusterable portions). This filter may utilize almost any criteria or combination of criteria desired, including for example, number of characters or tokens in a portion, the types of characters or tokens in a portion, an amount of known characters or tokens in a portion, the presence of patterns or regular expressions in a portion, or other criteria. A flag or other indication that the portion is clusterable (or unclusterable) is then stored in association with the portion 413. In one embodiment, each portion 413 not labeled or flagged as unclusterable will be labeled or flagged as clusterable. An example list of filtering criteria that may be used to determine whether a portion 413 is clusterable or unclusterable is given in Appendix A.

The portion embedder 408 may then embed the portions 413 of the documents (e.g., those identified as clusterable) to generate a portion embedding vector 417 for each portion 413. The portion embedding vector 417 generated for a portion 413 is stored in repository 405 in association with that portion 413. For example, the document preprocessor 400 may include or reference a repository of cross-lingual word embedding vectors 425 such as the FastText embeddings provided by Project Muse (Multilingual Unsupervised and Supervised Embeddings). Other types of embeddings may also be utilized without loss of generality, including for example Word2Vec, GloVE, BERT, ELMO or the like. The portion embedder 408 can thus map each portion 413 (or the tokens 415 thereof) to the word embedding vectors 425 to produce the portion embedding vector 417 for the portion 413. This mapping may be done, for example, by mapping each token 415 (or each of a determined subset of the tokens) of the portion 413 to a vector in the word embedding vectors to determine a vector for each token 415 of the portion 413, and utilizing that vector to generate the portion embedding vector 417 according to the order the tokens 415 occur in the portion 413.

In one specific embodiment, the portion embedder 408 can utilize SIF to generate a portion embedding vector 417 by using portion pre-embedder 412 for generating a pre-embedding vector 419 for the portion 413 and embedding adjuster 414 for adjusting the pre-embedding vector 419 for the portion 413 using an embedding adjustment vector 427 determined for the corpus of documents 407. To generate the pre-embedding vector 419 for a portion 413, the portion pre-embedder 412 may utilize a list of common tokens along with a percentage representing the frequency of a token within the tokenized text. The portion pre-embedder 412 can map each portion 413 (or the tokens 415 thereof) to the word embedding vectors 425 to produce the pre-embedding vector 419 such that each component of the pre-embedding vector 419 is equal to the weighted average of the corresponding components in the list of word embedding vectors 425 for the portion 413 (e.g., as selected according to the language of the portion 413), where the weights are derived by generating a vector equal in length to the number of tokens 415 in the portion 413 whose entries are the inverse of the frequency of the tokens 415 and then normalizing this pre-embedding vector 419 to sum to one. This pre-embedding vector 419 may be stored in repository 405 in association with the portion 413 from which it was generated.

In another embodiment, (e.g., instead of generating a separate pre-embedding vector and adjusting this pre-embedding vector) the portion embedder 408 can utilize a pre-trained sentence embedder based on transfer learning, such as BERT or ELMO or similar, to generate a portion embedding vector by directly embedding portion 413. Other types of pre-trained embedders may also be utilized without loss of generality, including for example USE, BERT, skip-thought, InferSent, or the like. As discussed, regardless of how the embedding vector 417 was generated the embedding vector 417 may be stored in repository 405 in association with the portion 413 from which it was generated.

In some embodiments, for the purpose of naming and snippet generation, the portion pre-embedder 412 may also determine a raw portion embedding vector (not shown) for each (clusterable) portion 413 from the list of word embedding vectors 425 such that each component of the raw embedding vector is equal to the unweighted average of the corresponding components in the list of word embedding vectors 425 for the portion (e.g., as selected according to the portion language). This raw portion embedding vector may be stored in repository 405 in association with the portion 413 from which it was generated.

Portion embedder 408 may also generate a corpus level embedding adjustment vector 427 for the corpus that reflects the sum of the first two eigenvectors of all portion pre-embeddings 419 determined for all (clusterable) portions 413 of the documents 407 of the corpus. These eigenvectors of the sentence pre-embeddings may be computed by utilizing, for example, Singular Value Decomposition (SVD) based on a random selection of portions 413 associated with document 407 of the corpus. This random selection or computation may be based on a batch size which may be configurable. Accordingly, embedding adjuster 414 may determine the portion embedding vector 417 for each (clusterable) portion 413 by projecting the embeddings 419 into a lower dimensional subspace that does not contain the basis defined by the corpus level embedding adjustment vectors 427 (e.g. the two eigenvectors determined by SVD).

Figure 5A:
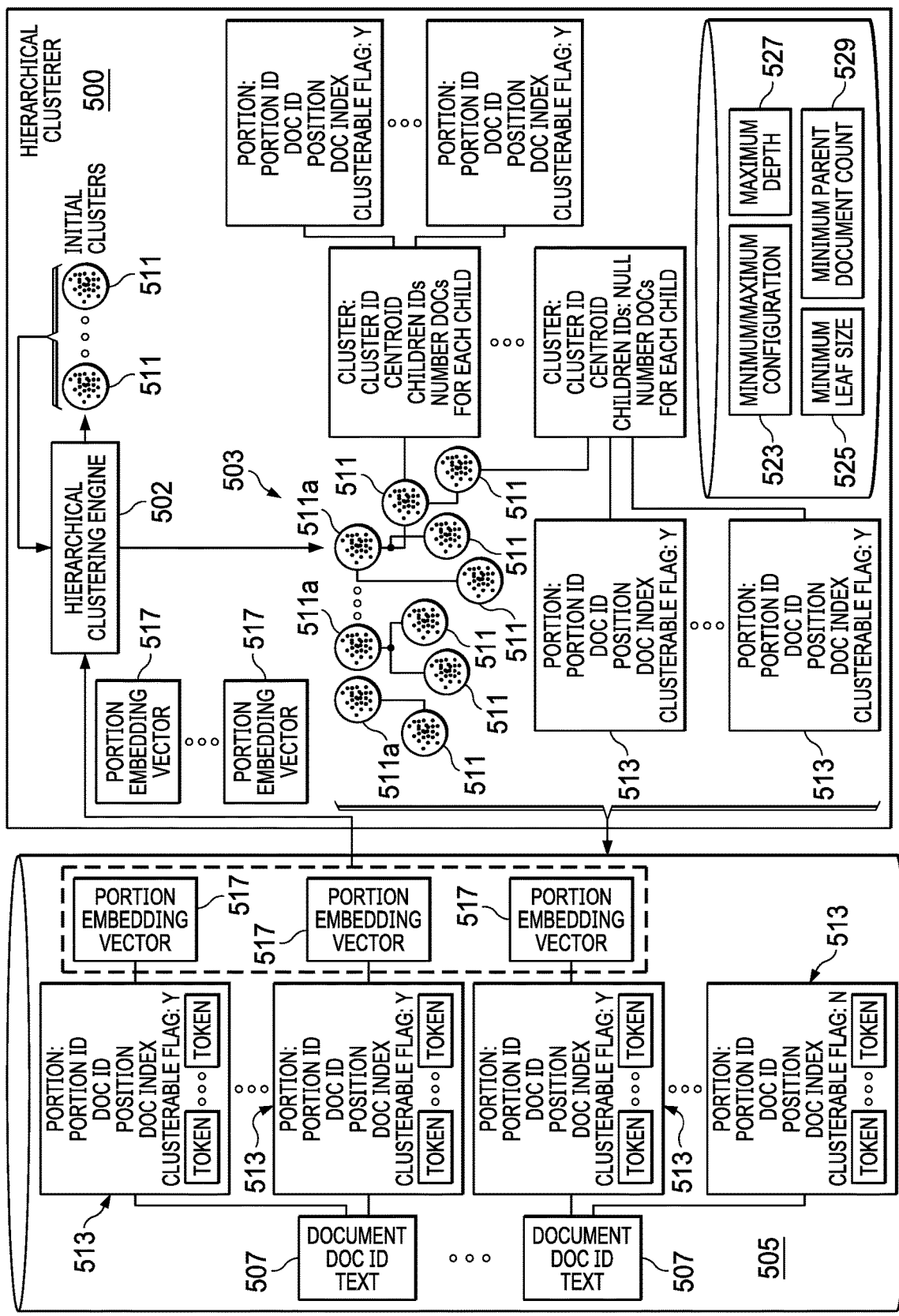
FIG. 5A is a block diagram of one embodiment of a hierarchical clusterer for use with embodiments of a topic clustering engine.

The (clusterable) portions of the documents of the corpus can thus be clustered based upon the portion embedding vector determined for those portions. FIG. 5A depicts one embodiment of a hierarchical clusterer that may be utilized by a topic clustering engine. Specifically, hierarchical clusterer 500 can perform hierarchical clustering on the (clusterable) portions 513 of the documents 507 based on the portion embedding vector 517 associated with each portion 513 to determine hierarchical clusters of portions 503. Thus, the portion embedding vectors 517 for the set of clusterable portions 513 may be provided to hierarchical clustering engine 502. Hierarchical clustering engine 502 may perform recursive k-means clustering to generate clusters 511 and organizational hierarchy 503 of clusters 511.

In one embodiment for example, recursive k-means clustering may be utilized by first determining a set of initial clusters 511a by applying k-means clustering to the clustering universe of portions 513 (e.g., initially the portion embedding vectors 517 for all the clusterable portions 513) to generate a set of (e.g., non-overlapping) clusters 511a of the portions. When determining the clusters 511, the hierarchical clustering engine 502 may assign each portion 513 to a cluster based on the distance between the portion embedding vector 517 of the portion 513 and the centroid of each determined cluster 511. For example, the hierarchical clustering engine 502 may assign a portion to exactly one cluster, namely, the cluster 511 with the centroid closest to the portion embedding vector 517 corresponding to the portion 513. Additionally, the hierarchical clustering engine 502 may be configured with a minimum or maximum cluster number 523 such that the number of initial clusters 511a (or other clusters 511) produced during clustering of the clustering universe is at least the minimum number (e.g., 2), and at most the maximum number (e.g., 20), of clusters.

For each of the determined initial clusters 511a, the hierarchical clustering engine 502 determines a cluster centroid (also known as just the centroid) which is a vector whose number of dimensions is equal to the number of dimensions in the portion embedding vectors of the portions being clustered. The hierarchical clustering engine 502 can also determine the number of documents 507 for which at least one constituent portion 513 is contained in the cluster 511; this is the number of constituent documents of that cluster 511. Each of the initial clusters 511a is then stored in the repository 505 (e.g., as part of the hierarchy of clusters 503), where each cluster 511 is associated with the cluster centroid for the cluster, the portions assigned to that cluster, and the number of constituent documents of that cluster.

To generate any remaining clusters of the hierarchy 503, the hierarchical clustering engine 502 may then recursively apply k-means clustering to each of the previously determined clusters 511 (e.g., initially the first recursive application of clustering is applied to the determined initial clusters 511a, the second recursive application of clustering is applied to the clusters determined from the first recursive application of clustering, etc. until termination criteria is reached).

In one embodiment, for example, during each application of clustering, each of the set of clusters 511 generated in a previous round of clustering may be evaluated to determine if that cluster 511 has a number of constituent documents exceeding a minimum parent document count 529 and if a traversal path from a root node of the organizational hierarchy 503 to that cluster 511 is not greater (e.g., or equal) to a maximum depth 527. If these conditions are met, that cluster 511 may be deemed a parent cluster. Alternatively, if cluster 511 has a number of constituent documents 507 less than (e.g., or equal) to the minimum parent document count 529 or if a traversal path from a root node or cluster of the organizational hierarchy 503 to that cluster 511 is greater (e.g., or equal) to a maximum depth 527, or if the hierarchical clustering engine 502 has determined that no further clustering is possible, then cluster 511 may be deemed a leaf cluster.

For each of the determined parent clusters, clustering can then be applied to that parent cluster by utilizing the portion embedding vectors 517 for the portions 513 assigned to that parent cluster 511 as the clustering universe, and applying k-means clustering to that clustering universe to generate a set of (e.g., non-overlapping) clusters 511 of the portions 513 of that parent cluster 511. Each cluster resulting from the clustering of a parent cluster (referred to as potential child clusters) is associated with its cluster centroid and the number of documents for which at least one constituent portion is contained in the cluster 511 (the number of constituent documents of that cluster). Each potential child cluster can then be evaluated to determine if it should be stored as part of the organizational hierarchy 503.

Specifically, in one embodiment it can be determined if the number of constituent documents 507 of the potential child cluster is greater than some minimum leaf size 525. In one embodiment, only if all of the potential child clusters have a number of constituent documents 507 greater than the minimum leaf size will the set of potential child clusters be deemed accepted clusters and stored as a child of the parent cluster (e.g., from which it was derived) in the hierarchy of clusters 503 and associated with the cluster centroid for the cluster, the portions assigned to that cluster, and the number of constituent documents of that cluster. Alternatively, each potential child cluster for which the number of constituent documents is greater than the minimum leaf size 525 will be deemed an accepted cluster 511 and stored as a child of the parent cluster 511 (e.g., from which it was derived) in the hierarchy 503 of clusters 511 and associated with the cluster centroid for the cluster 511, the portions 513 assigned to that cluster 511, and the number of constituent documents of that cluster 511.

The parent cluster 511 can then be updated with the identifiers of its respective child clusters 511. The recursive clustering can then be applied to each of these accepted clusters and the recursive clustering continued until there are no clusters in the hierarchy 503 that have a number of constituent documents exceeding the minimum parent document count 529, a traversal path from the root cluster 511 of the organizational hierarchy 503 to that cluster 511 is less (e.g., or equal) than a maximum depth 527, or have not been determined by the hierarchical clustering engine 502 that further clustering is possible. Each of the leaf clusters 511 can be identified as a leaf node or cluster (e.g., by having an empty set or NULL indicator for a number of child clusters 511). The determined organizational hierarchy 503 of clusters 511 can be stored in repository 505.

As discussed, for particular embodiments of this clustering of clustering, the number (e.g., a minimum or maximum cluster number of clusters) may be a parameter the hierarchical clusterer 500. In these embodiments, hierarchical clustering engine 502 may perform multiple single-level clustering attempts with a number of clusters of two or more between the minimum and maximum number of clusters, inclusively. If multiple clustering attempts are performed, the hierarchical clustering engine 502 may compute a metric describing the relative value of each such attempt. The clustering attempts shall be separated into two categories: (1) those attempts with all clusters having a number of constituent documents exceeding the minimum leaf size 525; and (2) the remaining attempts. If the number of attempts with all clusters having a number of constituent documents exceeding the minimum leaf size 525 is non-empty, the clustering attempt attaining the optimal relative value within those attempts shall be selected as the output of single-level clustering. In one embodiment, to aid in the performance of the hierarchical clusterer 500 the hierarchical clustering engine 502 may, if possible, perform clustering on each clustering universe as minibatch clustering. Thus, a (e.g., substantially random) subset of the portions of the clustering universe may be used to determine clusters for the clustering universe and the remainder of the portions 513 of the clustering universe assigned to those determined clusters. By performing such minibatch clustering when possible embodiments may serve to ensure that the time it takes to perform a clustering run does not grow significantly greater (e.g., exponentially) as the corpus of documents 507 grows. Moreover, by using such minibatch clustering, parallelization of clustering (or other) processes may occur, as, for example, it is not necessary to wait for all portions 513 to be assigned to a cluster before that cluster may be recursively clustered.

Figure 5B:
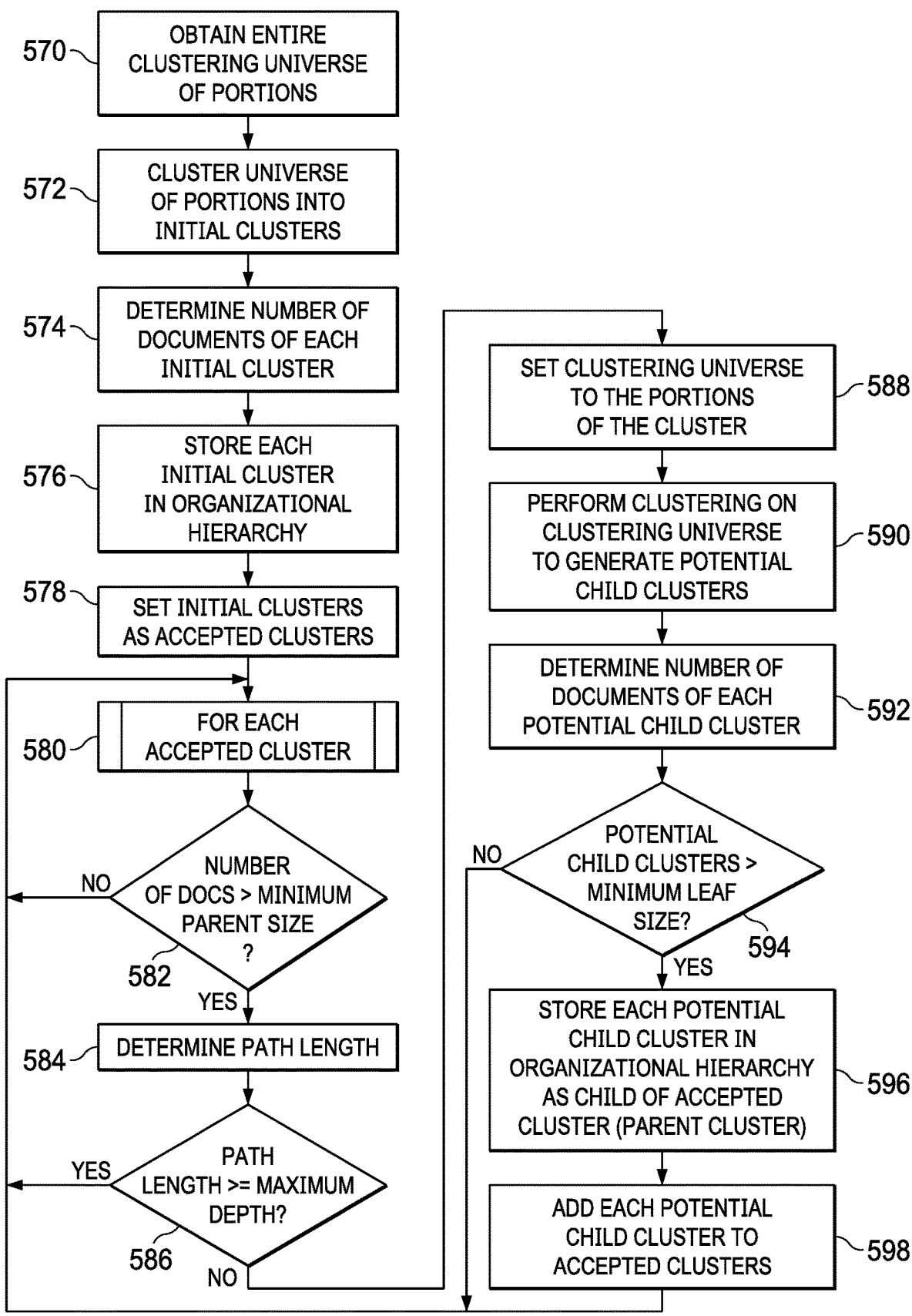
FIG. 5B is a flow diagram of one embodiment a method for clustering

FIG. 5B depicts one embodiment of a method for clustering that may be utilized by a topic clustering engine. Here, the entire universe of portions (e.g., the clusterable portions) of document of the corpus may be obtained along with the portion embedding vector associated with each portion (STEP 570). This universe of portions may be clustered into initial clusters based on the respective portion embedding vectors (STEP 572). For example, in one embodiment for example, recursive clustering may be utilized by first determining a set of initial clusters by applying clustering to the clustering universe of portions (e.g., initially the portion embedding vectors for all the clusterable portions) to generate a set of (e.g., non-overlapping) clusters of the portions. When determining the clusters the hierarchical clustering engine may assign each portion to a cluster based on the distance between the portion embedding vector of the portion and the centroid of each determined cluster. For example, a portion may be assigned to exactly one cluster with the centroid closest to the portion embedding vector corresponding to the portion.

The number of documents associated with each initial cluster can be determined (STEP 574). Each document for which at least one constituent portion is contained in the cluster may be considered a document associated (or clustered with) that cluster. Each of the initial clusters is then stored in a repository (e.g., as part of the organizational hierarchy), where each cluster is associated with the cluster centroid for the cluster, the portions assigned to that cluster, and the number of constituent documents of that cluster (STEP 576).

To generate any remaining clusters of the hierarchy recursive clustering may be applied to each of the previously determined clusters. Specifically, a set of accepted clusters may be set to the determined initial clusters (STEP 578). A loop through each of the set of accepted clusters can then begin (STEP 580). For an accepted cluster, it can be determined if the cluster has a number of constituent documents exceeding a minimum parent document count (STEP 582). If the number of constituent documents of that cluster is not greater than a minimum parent document count (N branch of STEP 582), that accepted cluster may be marked or otherwise stored in the organizational hierarchy as a leaf node or cluster and the next cluster in the set of accepted clusters obtained (STEP 580).

If however, the number of constituent documents of the accepted cluster is not greater than a minimum parent document count (Y branch of STEP 582) the length of a traversal path between root node or cluster of the organizational hierarchy to that accepted cluster can be determined (STEP 584). If the determined length of the traversal path is greater than or equal to a maximum depth (Y branch of STEP 586), that accepted cluster may be marked or otherwise stored as a leaf node or cluster and the next cluster in the set of accepted clusters obtained (STEP 580).

If, however, the determined length of the traversal path is less than the maximum depth (N branch of STEP 586), the clustering universe can then be set to the portions of the accepted cluster (STEP 588) and clustering applied to the clustering universe of portions (e.g., using the portion embedding vectors for all these clusterable portions) to generate a set of clusters of the portions (STEP 590). The resulting clusters are referred to as potential child clusters. The number of documents associated with each potential child cluster can then be determined (STEP 592).

If the number of constituent documents of each of the potential child clusters is greater (or equal) than some minimum leaf size (Y branch of STEP 594) each of the set of potential child clusters are stored as a child of the accepted cluster (e.g., from which they were derived) in the organizational hierarchy and associated with the cluster centroid for the cluster, the portions assigned to that cluster, and the number of constituent documents of that cluster (STEP 596). The accepted cluster (e.g., parent cluster) can then be updated with the identifiers of its respective child clusters (the potential child clusters just added to the organizational hierarchy). Moreover, each of the determined potential child clusters may be added to the set of accepted clusters (STEP 598).

It will be noted here that other (e.g., additional or alternative) metrics or conditions may be utilized as criteria to determine if a potential child cluster should be stored (e.g., and added to the set of accepted clusters). For example, density based considerations may be utilized as an alternative, or additionally to, the number of constituent documents of a cluster in making such a determination. As but one example, a density consideration that may be utilized is the density of the embedding vectors of an accepted cluster or a potential child cluster. In certain embodiments, therefore, based on a determination that there is only one dense collection of embedding vectors for a given clustering universe (e.g., for an accepted cluster), it can be determined that no further sub-clusters should be made (e.g., no further recursive clustering should be done). This determination may be made in certain embodiments regardless of parent document count or other criteria.

Returning to FIG. 5B, once the determined potential child clusters are be added to the set of accepted clusters (STEP 598), or it is determined that the number of constituent documents of each of the potential child clusters is not greater (or equal) than some minimum leaf size (N branch of STEP 594), the next cluster in the set of accepted clusters can then be obtained (STEP 580). The recursive clustering can then be applied to each of these accepted clusters and the recursive clustering continued until there are no clusters in the organizational hierarchy that have a number of constituent documents exceeding the minimum parent document count and a traversal path from the root cluster of the organizational hierarchy to that cluster is greater (e.g., or equal) to a maximum depth.

Figure 6A:
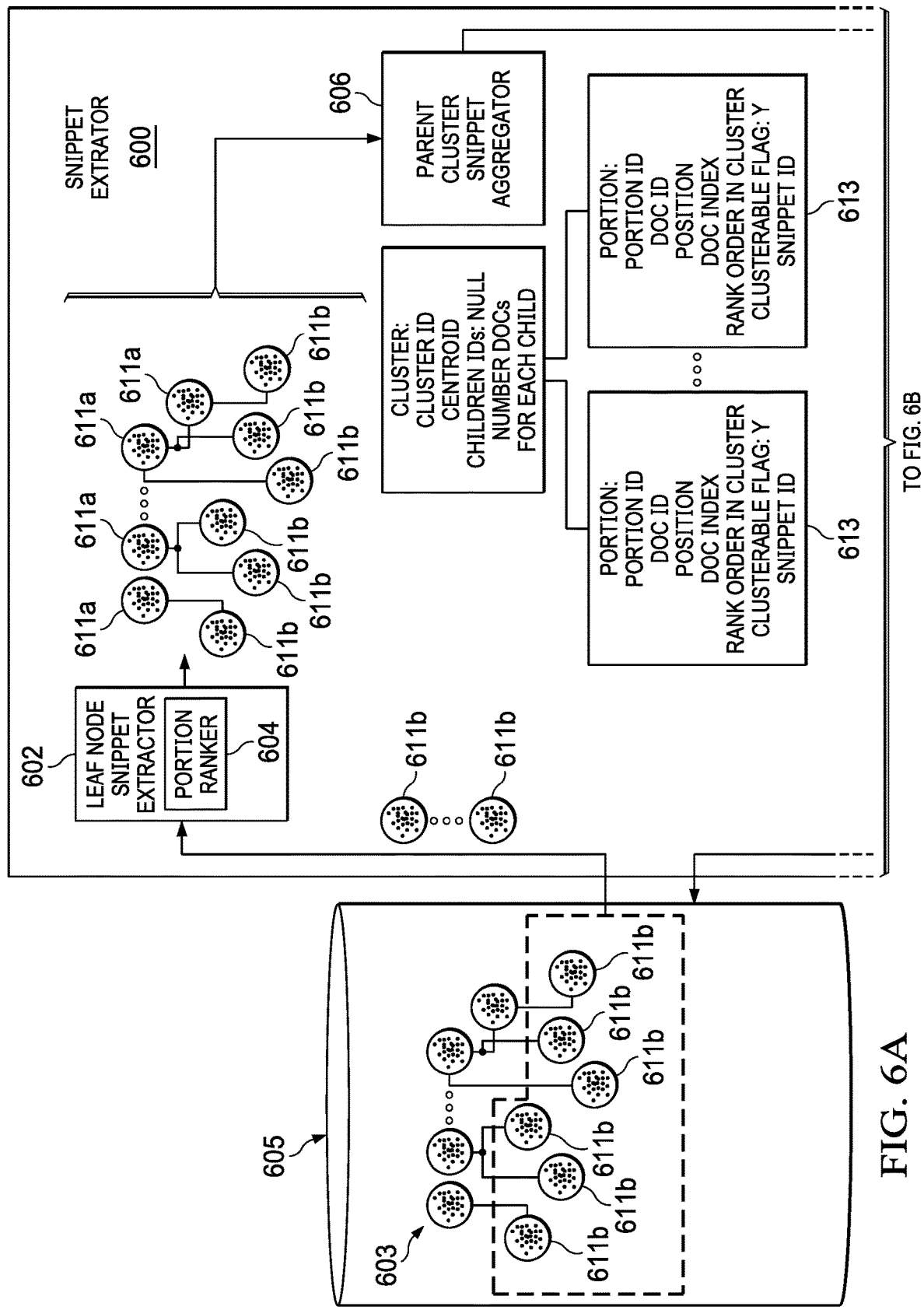
FIGS. 6A and 6B are a block diagram of one embodiment of a snippet extractor for use with embodiments of a topic clustering engine.
Figure 6B:
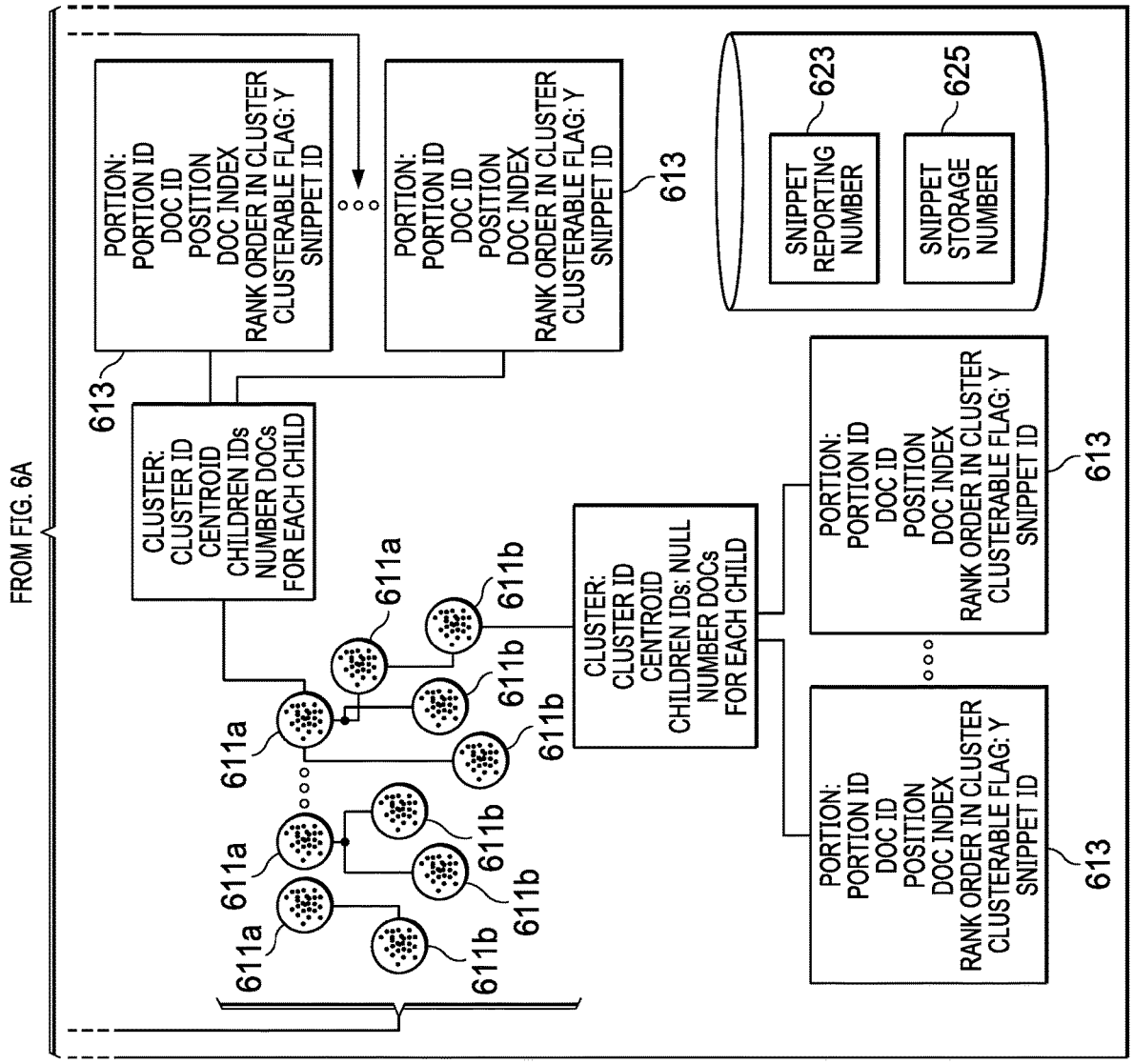

Once the organizational hierarchy of clusters is determined, representative snippets for those clusters of the organizational hierarchy may be generated. FIGS. 6A and 6B depict one embodiment of a snippet extractor that may be utilized by a topic clustering engine for generating snippets. Snippets associated with a cluster 611 may be ranked portions 613 assigned to that cluster 611 of a sufficiently high ranking (e.g., the top ten, top twenty, top one hundred, etc.). To determine snippets for a cluster 611 then, in certain embodiments the portions 613 assigned to the cluster 611 (or a subset thereof) may be ranked and ordered according to rank such that a top number of portions 613 may be utilized as snippets for that cluster 611. There may be a different number of these snippets utilized in different contexts. There may, for example, be a reporting snippet number 623 describing a number of snippets to report for a cluster 611 when a user accesses or interacts with the organizational hierarchy 603 (e.g., which may default to all assigned portions 613), or a storing snippet number 625 describing a number of snippets to store for a cluster 611 in the organizational hierarchy 603 (e.g., which may default to all assigned portions).

These snippets may be determined differently for different types of clusters 611 within the organizational hierarchy 603. Here, for example, snippet extractor 600 may include leaf node snippet extractor 602 including portion ranker 604 to determine snippets for leaf clusters 611b of the organizational hierarchy 603. Leaf node snippet extractor 602 may rank order all portions 613 assigned to the leaf cluster 611b according to the Euclidean distance of the portion embedding vector of that portion 613 to the centroid of that cluster 611b, with portions 613 having smaller distances ranked higher than those having larger distances. The rankings of each portion 613 of the leaf cluster 611b may be stored in association with that leaf cluster 611b and portion 613 in the repository 605. Leaf node snippet extractor 602 can then associate or identify the top-ranked portions for the cluster 611b to that cluster 611b in the organizational hierarchy 603 as that cluster's snippets (e.g., or a number of the top-ranked portions up to the reporting snippet number or storing snippet number). In one embodiment, when determining these snippets any portions having a language other than a default language (e.g., for the corpus of documents, English) may be ignored.

Snippet extractor 600 may also include parent cluster snippet aggregator 606 to determine the snippets for parent clusters 611a in the organizational hierarchy 603. In one embodiment, parent cluster snippet aggregator 606 aggregates all snippets (e.g., portions 613 above a certain rank) from the children clusters 611 of that parent cluster 611a and rank orders these snippets according to the Euclidean distance of the portion embedding vector for each snippet (portion 613) to the centroid of the parent cluster 611a (again with portions having smaller distances to the centroid of the parent cluster ranked higher than those having larger distances). The parent cluster snippet aggregator 606 can then associate the snippets of the child clusters 611 to the parent cluster 611a in a round-robin fashion by selecting the top-ranked (with respect to the parent cluster's centroid) snippet of each child cluster 611 as the first set of snippets for the parent cluster, and then taking the next highest ranked snippet of each child cluster 611 as the second set of snippets for the parent cluster 611a, and associating these in the same way, until all such snippets of all child clusters 611 are exhausted or until a number of snippets to store for the parent cluster 611a is fulfilled. The parent cluster snippet aggregator 606 can then associate or identify the selected snippets (e.g., portions 613) for the parent cluster 611a to that cluster 611a in the organizational hierarchy 603 as that cluster's snippets (e.g., in the order the snippets were selected from the child clusters 611).

Figure 7:
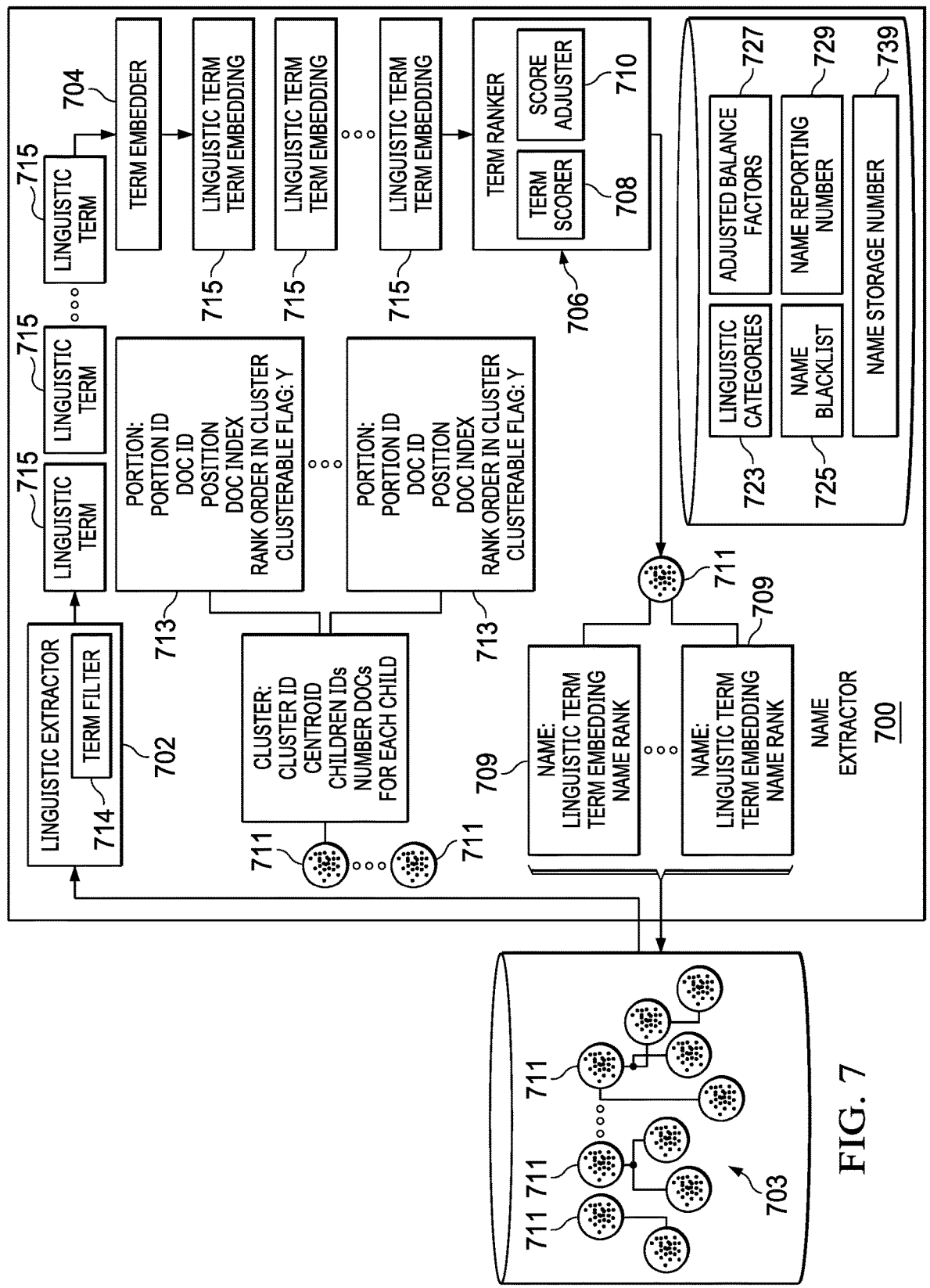
FIG. 7 is a block diagram of one embodiment of a name extractor for use with embodiments of a topic clustering engine.

Referring now to FIG. 7, one embodiment of a name extractor that may be utilized by a topic clustering engine to generate names for a cluster of the organizational hierarchy is depicted. Name extractor 700 may extract terms from the portions 713 associated with a cluster 711 and associate these extracted terms with the cluster 713 as names 709 of the cluster. The portions from which these terms are extracted may be a subset of the portions 713 associated with the cluster 711, such as the snippets associated with that cluster 711. In particular, according to certain embodiments, the extracted terms may be scored and ranked according to the score such that a top number of the terms may be utilized as names 709 for that cluster 711. The name extractor 700 may thus be configured with a reporting name number 729 describing a number of names to report for a cluster when a user accesses or interact with the organizational hierarchy, or a storage name number 739 describing a number of names to store for a cluster 711 in the organizational hierarchy 703.

In one specific embodiment, the terms extracted to determine the names 709 for a cluster 711 may be based on one or more linguistic categories. Thus, in certain embodiments, the name extractor 700 includes a configurable list of linguistic categories 723 to be extracted from portions 713 associated with a cluster 711, including for example nouns, verbs, or noun phrases. Accordingly, each cluster 711 may be provided to linguistic extractor 702 to extract each of the configured linguistic categories 723 from one or more portions 713 associated with each cluster. For example, the linguistic extractor 702 may extract all terms identified as the configured linguistic categories 723 from among the snippets (e.g., top ranked portions 713) associated with that cluster 711. This extraction may be performed using, for example, a natural language processing (NLP) tool or library such as SpaCy or the like. Linguistic extractor 702 may also include an element or term filter 714 to remove any term in the extracted terms that has a punctuation character, or any term that is included, or whose lemma is included, in a (e.g., configurable) blacklist 725 of terms not to be included or selected as names. Such lemmas can be produced, for example, by using SpaCy.

The extracted terms 715 can be provided to term embedder 704. For each extracted term of a linguistic type, the term embedder 704 may generate an embedding vector for the term and associate the embedding vector with the term 715. The generation of an embedding vector for a term 715 may use the same, or different, processes or methods as used for generating the portion embedding vectors for the portions of the documents as described above. In one embodiment, for terms that are a single word, a term embedding vector may be determined from the repository of word embeddings used to generate portion embedding vectors, while for terms that are multi-word phrases, the term embedding vector for the term may be an average of each component of the word embedding vectors for the constituent words of the phrase.

Term ranker 706 can then rank the extracted terms 715 based on a score for each term determined between a snippet centroid for the cluster (e.g., the cluster for which the names are being determined) and the term embedding vector of each extracted term 715 by term scorer 708. This score may be a similarity measure such as a cosine similarity or the like. A snippet centroid for a cluster 711 can be determined by term ranker 706 based on a raw portion embedding vector for each of the snippets of the cluster 711. This raw portion embedding vector for a snippet may be stored in association with the snippet during the determination of the portion embedding vector for the snippet or, alternatively, may be determined for the snippet from a list of word embedding vectors such that each component of the raw embedding vector is equal to the unweighted average of the corresponding components in the list of the word embedding vectors for the snippet. Thus, based on the raw portion embedding vector for each snippet of the cluster 711, the snippet centroid for the cluster can be determined.

Based on the score determined for each term 715, the terms 715 can be ranked and a top-ranked number of terms (e.g., of each linguistic category) may be selected and stored as the names 709 for the cluster 711 (e.g., with a number of names stored not to exceed the storing name number). In one specific embodiment, before the terms 715 are ranked and selected as names the score adjuster 710 may apply a balance factor to the similarity score for each term 715 to weight the similarity score for the term 715. In one instance, score adjuster 710 may determine a balance factor 727 for each linguistic category and apply the appropriate balance factor 727 for the linguistic category to the terms associated with that linguistic category.

As another example, a specific balance factor 727 may be determined for each cluster 711 and for each linguistic category 723 based on the depth or height of the cluster 711 within the organizational hierarchy 703. When determining names 709 for a particular cluster, the balance factor 727 associated with both that cluster 711 and the linguistic category 723 of the term 715 may be applied to the score for that term 715 to weight the score according to the applicable balance factor 727. Based on the (adjusted) score for each term 715, the terms 715 can be ranked and a top-ranked number of terms 715 (e.g., of each linguistic category) may be selected and stored in repository 705 as the names 709 for the cluster 711. When determining the top-ranked number of terms 715 for each linguistic category 723 term ranker 706 may filter the ranked list of terms 715 to remove variant spellings, grammatical forms, or terms 715 that vary only in punctuation, keeping only the top-ranked spelling, grammatical form, or punctuation variety.

Figure 8:
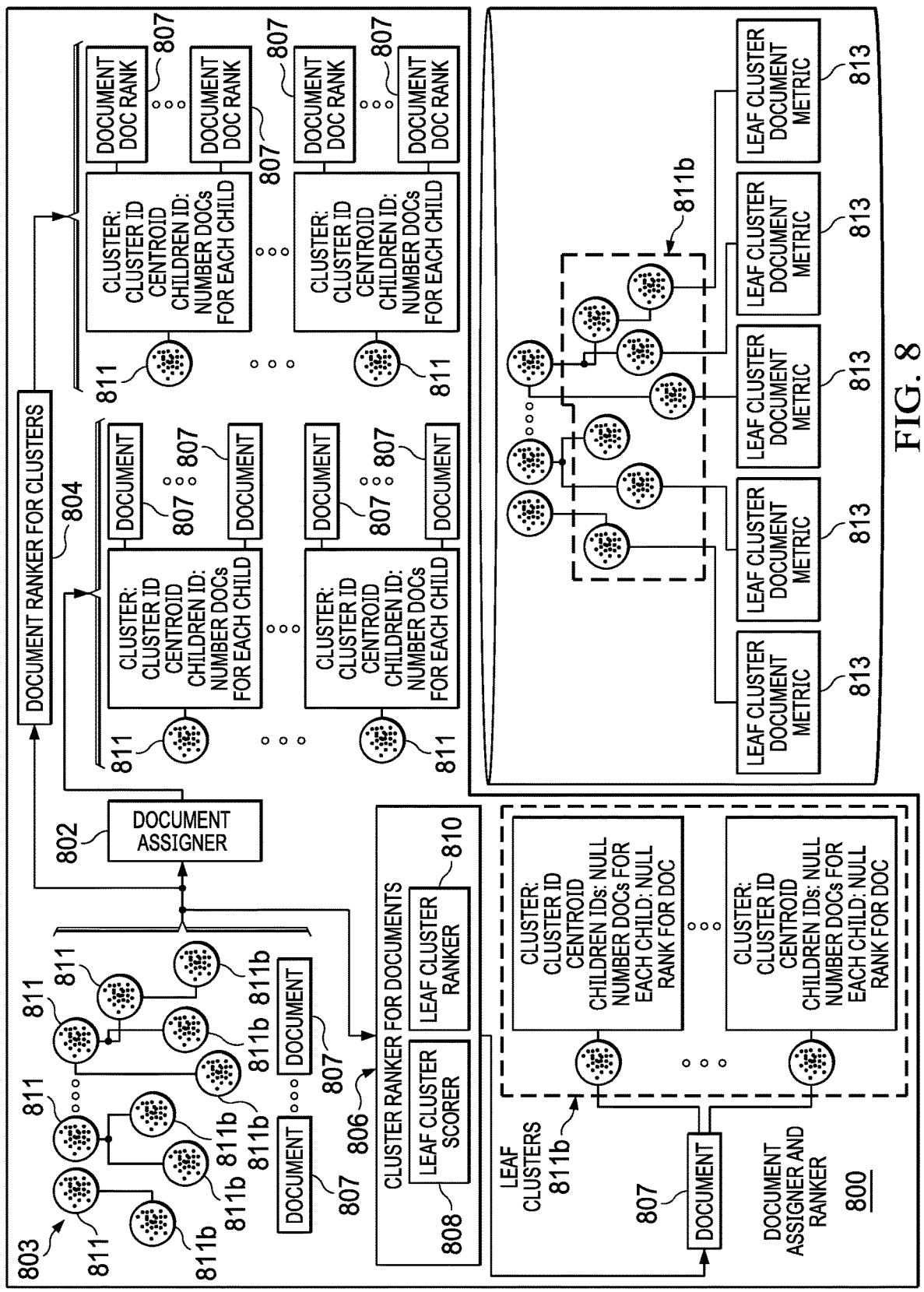
FIG. 8 is a block diagram of one embodiment of a document assigner and ranker for use with embodiments of a topic clustering engine.

Turning now to FIG. 8, one embodiment of a document assigner and ranker that may be utilized by a topic clustering engine to assign documents to clusters, rank documents for clusters and rank clusters for documents is depicted. Document assigner and ranker 800 includes document assigner 802, document ranker 804 and cluster ranker 806. Thus, the organizational hierarchy 803 of clusters and documents 807 of the corpus can be obtained by each of these components. Document assigner 802 may assign documents 807 (e.g., documents 807 that include at least one portion designated as clusterable) to clusters 811 of the organizational hierarchy 803 by assigning that document to a cluster 811 if the document 807 contains at least one clusterable portion that is associated with that cluster 811. For example, for each document 807, document assigner 802 may determine if any associated portions of that document 807 are labeled as clusterable. For each portion labeled clusterable, the document assigner 802 may determine all clusters 811 associated with that portion and assign the document 807 to those clusters 811 (e.g., if the cluster is not already assigned to the document 807). The association between the documents 807 and the clusters 811 of the organizational hierarchy 803 may then be stored in the repository 805.

Cluster ranker 806 may determine a ranking of clusters with which a particular document is associated. The clusters 811 ranked for a document 807 may be limited in some cases to a subset of the clusters of the organizational hierarchy 803, such as the parent clusters or the leaf clusters. In one particular embodiment, the cluster ranker 806 may determine a ranked list of leaf clusters 811*b* with which a document 807 is associated. In particular, for a document 807 containing at least one (clusterable) portion and for each leaf cluster 811*b* of the organizational hierarchy 803 with which the document is associated (e.g., as determined by document assigner 802), a leaf cluster scorer 808 of the cluster ranker 806 can determine a document portion metric representing an amount (e.g., a percentage) of portions of the document that are members of that leaf cluster 811*b*. Additionally, for each leaf cluster 811*b*, the leaf cluster scorer 808 can determine a leaf cluster metric 813 representing an amount (e.g., a percentage) of documents 807 of the corpus that include at least one (clusterable) portion that are associated with that leaf cluster 807.

Thus, for a document containing at least one (clusterable) sentence and for each leaf cluster 811 of the organizational hierarchy 803 with which the document 807 is associated, the leaf cluster scorer 808 may determine a salience-weighted importance of the leaf cluster 811*b* with respect to the document 807 by dividing the determined document portion metric by the leaf cluster metric. The leaf cluster ranker 810 of the cluster ranker 806 can then rank the leaf clusters 811*b* with which the document 807 is associated according to the determined salience-weighted importance, with leaf clusters 811*b* with higher values given higher rank. The ranking of each leaf cluster 811*b* associated with the document 807 can then be stored in the repository 805.

Document ranker 804 of document assigner and ranker 800 may determine a ranking of the documents 807 associated with a particular cluster 811 with respect to that cluster. This ranked list of documents 807 for a cluster can be determined based on the ranked list of portions associated with that cluster (e.g., as determined when determining snippets for the cluster as discussed above). The ranked list of portions for the cluster 811 may be iterated through starting from the highest ranking portion. For each portion, the document 807 associated with that portion may be determined and added as the next highest ranking document to the ranked list of documents for that cluster (if the document 807 is not already included on the list). Thus, the document 807 associated with the highest ranking portion associated with the cluster 811 will be the highest ranked document in the ranked list of documents for that cluster, the document 807 associated with the second highest ranking portion associated with the cluster 811 (if different from the highest ranking document) will be the second highest ranked document in the ranked list of documents 807 for that cluster, etc. The determined ranking of the documents 807 associated with the cluster can then be stored in the repository 805 in association with the documents 807 and the cluster 811 of the organizational hierarchy 803.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

APPENDIX A

A filter according to one embodiment may utilize a configurable minimum and maximum number of characters for portions, and each portion containing less than the maximum or more than the minimum the portion will be labeled as unclusterable.

A filter according to one embodiment may utilize a configurable minimum percentage of alphanumeric characters, and each portion with a percentage of alphanumeric characters less than this minimum the portion will be labeled as unclusterable.

A filter according to one embodiment may utilize a configurable maximum percentage of punctuation characters, and each portion containing a percentage of punctuation characters greater than this maximum the portion will be labeled as unclusterable.

A filter according to one embodiment may utilize a configurable maximum percentage of numeric characters, and each portion containing a percentage of numeric characters greater than this maximum the portion will be labeled as unclusterable.

A filter according to one embodiment may utilize a configurable minimum percentage of known words such that if the percentage of tokens not contained in some set of known words is less than this minimum, the portion will be labeled as unclusterable.

A filter according to one embodiment may utilize a configurable maximum percentage of HTML or other markup language patterns and a list of regular expression (regex) patterns representing HTML formatting such that if the percentage of tokens for the portion matching any of these patterns is greater than the maximum, the portion will be labeled as unclusterable.

A filter according to one embodiment may utilize a configurable maximum percentage of e-mail addresses as well as a regex defined to represent e-mail addresses, such that if the percentage of tokens matching this regex for the portion is greater than this maximum the portion shall be labeled as unclusterable.

A filter according to one embodiment may utilize a configurable maximum number of repeated sequences and a regex to identify such sequences, which shall consist of repeated characters that are neither alphanumeric, nor whitespace, nor line breaks. Each portion containing a number of matches for this regex exceeding the minimum the portion will be labeled as unclusterable.

A filter according to one embodiment may utilize a configurable maximum ratio of newlines to characters, and for each portion for which this ratio of newlines to characters exceeds the maximum, that portion will be labeled as unclusterable.

A filter according to one embodiment may utilize a configurable minimum average number of tokens per line, and any portion for which the average number of tokens per line is less than the minimum the portion will be labeled as unclusterable.

A filter according to one embodiment may utilize a configurable minimum number of tokens within a portion, and each portion containing less tokens than the minimum will be labeled as unclusterable.

A filter according to one embodiment may utilize a configurable maximum number of tokens, and each portion containing more tokens than the maximum shall be truncated to contain the tokens occurring in the portion up to the maximum number.

A filter according to one embodiment may identify e-mail headers and will label portions so identified as unclusterable.

A filter according to one embodiment may utilize a curated list of regexes intended to match the header lines of an e-mail and may identify a portion as an e-mail header if it matches any of these regexes or contains a sufficient number of matches for these regexes.

What is claimed is:

1. A system for document analysis comprising:
    a processor;
    a data store, having a corpus comprising a set of electronic documents; and
    a non-transitory computer readable medium comprising instructions for:
        obtaining the set of documents of the corpus;
        determining portions from the set of documents of the corpus;
            generating an organizational hierarchy comprising hierarchically organized clusters, each cluster associated with a corresponding subset of portions by:
        embedding each of the portions to generate a portion embedding vector for each of the portions;
        clustering the portions based on the portion embedding vectors for the portions to generate initial clusters of the organizational hierarchy, wherein each of the generated initial clusters is associated with the corresponding subset of portions, and recursively clustering each of the initial clusters, wherein recursively clustering each initial cluster comprises clustering the corresponding subset of portions of that initial cluster until a termination criteria is met;

associating each of the set of electronic documents with every cluster within the hierarchically organized clusters that is associated with at least one of the portions determined from that document; and determining a set of snippets for the clusters of the hierarchically organized clusters, wherein the set of snippets for a cluster is determined by ranking at least some of the subset of portions associated with the cluster and ranking at least some of the subset of portions associated with the cluster comprises:

ranking at least some of the subset of portions for each leaf cluster of the hierarchically organized clusters based on a score determined for at least some of the subset of portions, wherein scoring a portion for a leaf cluster is based on the portion embedding vector for the portion and a centroid of the leaf cluster, and ranking at least some of the subset of the portions for each parent cluster of the hierarchically organized clusters, wherein ranking at least some of the subset of the portions for a parent cluster is based on the ranking of at least some of the subset of the portions associated with each child cluster of that parent cluster.

2. The system of claim 1, wherein the instructions are further for determining a name for each cluster of the set of hierarchically organized clusters, wherein determining the name for the cluster comprises:

extracting terms from at least some of the subset of portions associated with the cluster;

embedding the extracted terms to generate a term embedding vector for each term;

scoring the extracted terms to determine a score for each extracted term; and selecting the names for the cluster based on the scores for the extracted terms.

3. The system of claim 2, wherein at least some of the subset of portions from which terms are extracted comprises snippets determined for the cluster, wherein the snippets for the cluster are determined by ranking at least some of the subset of portions associated with that cluster.

4. The system of claim 1, wherein the set of electronic documents comprises documents in multiple languages.

5. The system of claim 1, wherein each of the portions is a sentence.

6. The system of claim 1, wherein clustering is performed using k-means clustering.

7. The system of claim 1, wherein the instructions are further for filtering a list of the documents based on the organizational hierarchy.

8. The system of claim 7, wherein the instructions are further for generating a pruned organizational hierarchy by pruning the organizational hierarchy based on a list of the documents.

9. A method for organizing electronic documents, comprising:

obtaining a set of electronic documents of a corpus;

determining portions from the set of documents of the corpus;

generating an organizational hierarchy comprising hierarchically organized clusters, each cluster associated with a corresponding subset of portions by:

embedding each of the portions to generate a portion embedding vector for each of the portions;

clustering the portions based on the portion embedding vectors for the portions to generate initial clusters of the organizational hierarchy, wherein each of the generated initial clusters is associated with the corresponding subset of portions, and recursively clustering each of the initial clusters, wherein recursively clustering each initial cluster comprises clustering the corresponding subset of portions of that initial cluster until a termination criteria is met;

associating each of the set of electronic documents with every cluster within the hierarchically organized clusters that is associated with at least one of the portions determined from that document; and determining a set of snippets for the clusters of the hierarchically organized clusters, wherein the set of snippets for a cluster is determined by ranking at least some of the subset of portions associated with the cluster and ranking at least some of the subset of portions associated with the cluster comprises:

ranking at least some of the subset of portions for each leaf cluster of the hierarchically organized clusters based on a score determined for at least some of the subset of portions, wherein scoring a portion for a leaf cluster is based on the portion embedding vector for the portion and a centroid of the leaf cluster, and ranking at least some of the subset of the portions for each parent cluster of the hierarchically organized clusters, wherein ranking at least some of the subset of the portions for a parent cluster is based on the ranking of at least some of the subset of the portions associated with each child cluster of that parent cluster.

10. The method of claim 9, wherein the method further comprises determining a name for each cluster of the set of hierarchically organized clusters by:

extracting terms from at least some of the subset of portions associated with the cluster;

embedding the extracted terms to generate a term embedding vector for each term;

scoring the extracted terms to determine a score for each extracted term; and selecting the names for the cluster based on the scores for the extracted terms.

11. The method of claim 10, wherein at least some of the subset of portions from which terms are extracted comprises snippets determined for the cluster, wherein the snippets for the cluster are determined by ranking at least some of the subset of portions associated with that cluster.

12. The method of claim 9, wherein the set of electronic documents comprises documents in multiple languages.

13. The method of claim 9, wherein each of the portions is a sentence.

14. The method of claim 9, wherein clustering is performed using k-means clustering.

15. The method of claim 9, wherein the method further comprises filtering a list of the documents based on the organizational hierarchy.

16. The method of claim 15, wherein the method further comprises generating a pruned organizational hierarchy by pruning the organizational hierarchy based on a list of the documents.

17. A non-transitory computer readable medium comprising instructions for:

obtaining a set of electronic documents of a corpus;

determining portions from the set of documents of the corpus;

generating an organizational hierarchy comprising hierarchically organized clusters, each cluster associated with a corresponding subset of portions by:
embedding each of the portions to generate a portion embedding vector for each of the portions;
clustering the portions based on the portion embedding vectors for the portions to generate initial clusters of the organizational hierarchy, wherein each of the generated initial clusters is associated with the corresponding subset of portions, and
recursively clustering each of the initial clusters, wherein recursively clustering each initial cluster comprises clustering the corresponding subset of portions of that initial cluster until a termination criteria is met;
associating each of the set of electronic documents with every cluster within the hierarchically organized clusters that is associated with at least one of the portions determined from that document; and
determining a set of snippets for the clusters of the hierarchically organized clusters, wherein the set of snippets for a cluster is determined by ranking at least some of the subset of portions associated with the cluster and ranking at least some of the subset of portions associated with the cluster comprises:
ranking at least some of the subset of portions for each leaf cluster of the hierarchically organized clusters based on a score determined for at least some of the subset of portions, wherein scoring a portion for a leaf cluster is based on the portion embedding vector for the portion and a centroid of the leaf cluster, and
ranking at least some of the subset of the portions for each parent cluster of the hierarchically organized clusters, wherein ranking at least some of the subset of the portions for a parent cluster is based on the ranking of at least some of the subset of the portions associated with each child cluster of that parent cluster.

18. The non-transitory computer readable medium of claim 17, wherein the instructions are further for determining a name for each cluster of the set of hierarchically organized clusters, wherein determining the name for the cluster comprises:
extracting terms from at least some of the subset of portions associated with the cluster;
embedding the extracted terms to generate a term embedding vector for each term;
scoring the extracted terms to determine a score for each extracted term; and
selecting the names for the cluster based on the scores for the extracted terms.

19. The non-transitory computer readable medium of claim 18, wherein at least some of the subset of portions from which terms are extracted comprises snippets determined for the cluster, wherein the snippets for the cluster are determined by ranking at least some of the subset of portions associated with that cluster.

20. The non-transitory computer readable medium of claim 17, wherein the set of electronic documents comprises documents in multiple languages.

21. The non-transitory computer readable medium of claim 17, wherein each of the portions is a sentence.

22. The non-transitory computer readable medium of claim 17, wherein clustering is performed using k-means clustering.

23. The non-transitory computer readable medium of claim 17, wherein the instructions are further for filtering a list of the documents based on the organizational hierarchy.

24. The non-transitory computer readable medium of claim 23, wherein the instructions are further for generating a pruned organizational hierarchy by pruning the organizational hierarchy based on a list of the documents.

* * * * *